(12) United States Patent
Rudnitzki et al.

(10) Patent No.: US 10,760,543 B2
(45) Date of Patent: Sep. 1, 2020

(54) SYSTEM AND METHOD FOR VALVE EVENT DETECTION AND CONTROL

(71) Applicant: AI ALPINE US BIDCO INC, Wilmington, DE (US)

(72) Inventors: Ryan Michael Rudnitzki, Wauwatosa, WI (US); Jeffey Jacob Bizub, Milwaukee, WI (US); Rajesh Katta, Bangalore (IN); Sandro Rivellini, Jenbach (AT)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 0 days.

(21) Appl. No.: 15/648,257

(22) Filed: Jul. 12, 2017

(65) Prior Publication Data

US 2019/0017487 A1    Jan. 17, 2019

(51) Int. Cl.
*F02P 5/152* (2006.01)
*G01L 23/22* (2006.01)
(Continued)

(52) U.S. Cl.
CPC .......... *F02P 5/152* (2013.01); *F02D 35/027* (2013.01); *F02D 41/009* (2013.01);
(Continued)

(58) Field of Classification Search
CPC ........... F02D 2041/001; F02D 41/1498; F02D 2200/025; F02D 2041/1432;
(Continued)

(56) References Cited

U.S. PATENT DOCUMENTS

| 5,029,565 A | 7/1991 | Talbot |
| 5,111,790 A | 5/1992 | Grandy |

(Continued)

FOREIGN PATENT DOCUMENTS

| CN | 203480037 | 3/2014 |
| EP | 273601 | 2/1987 |

(Continued)

OTHER PUBLICATIONS

U.S. Appl. No. 14/320,101, filed Jun. 30, 2014, Ryan Thomas Smith.

(Continued)

*Primary Examiner* — Carl C Staubach
(74) *Attorney, Agent, or Firm* — Fletcher Yoder, P.C.

(57) ABSTRACT

In one embodiment, a system includes an engine control system configured to control an engine. The engine control system comprises a processor configured to receive a vibration signal sensed by a knock sensor disposed in an engine. The processor is further configured to correlate the vibration signal with a fingerprint having at least an ADSR envelope indicative of the operating event of a valve train of the combustion engine, analyze the vibration signal with a statistical valve train model, or a combination thereof. The processor is also configured to detect if the operating event has occurred based on correlating of the noise signal with the fingerprint, based on analyzing the vibration signal with a statistical valve train model, or a combination thereof, and to control the valve train based on the operating event.

17 Claims, 16 Drawing Sheets

(51) Int. Cl.
  *F02D 35/02* (2006.01)
  *F02D 41/40* (2006.01)
  *F02D 41/00* (2006.01)
  *F02D 41/28* (2006.01)

(52) U.S. Cl.
  CPC .......... *F02D 41/401* (2013.01); *G01L 23/226* (2013.01); *F02D 2041/001* (2013.01); *F02D 2041/288* (2013.01); *F02D 2200/025* (2013.01); *G01L 2023/228* (2013.01)

(58) Field of Classification Search
  CPC ............ F02D 2041/286; F02D 13/0207; F02P 5/152; F02P 2017/128; G01L 23/225; G01L 23/221; G01L 23/227; G01L 23/226; G01L 23/22; F02B 77/085; G01M 15/12; G01M 15/11; F01L 1/34; F01L 2800/00
  See application file for complete search history.

(56) References Cited

U.S. PATENT DOCUMENTS

| | | | |
|---|---|---|---|
| 5,115,778 A | 5/1992 | Holroyd | |
| 5,119,783 A | 6/1992 | Komurasski | |
| 5,241,480 A | 8/1993 | Takaku et al. | |
| 5,257,533 A | 11/1993 | Imada | |
| 5,337,240 A | 8/1994 | Nakagawa et al. | |
| 5,339,245 A | 8/1994 | Hirata et al. | |
| 5,361,213 A | 11/1994 | Fujieda et al. | |
| 5,392,642 A | 2/1995 | Tao | |
| 5,400,648 A | 3/1995 | Mahr | |
| 5,452,699 A | 9/1995 | Rossignol | |
| 5,467,638 A | 11/1995 | Philipp | |
| 5,594,649 A | 1/1997 | Cook et al. | |
| 5,693,936 A | 12/1997 | Komachiya et al. | |
| 5,763,769 A | 6/1998 | Kluzner | |
| 5,837,887 A | 11/1998 | Shibata et al. | |
| 5,905,193 A | 5/1999 | Hashizume et al. | |
| 5,932,801 A | 8/1999 | Akishita et al. | |
| 5,934,256 A | 8/1999 | Wenzlawski et al. | |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,285,151 B1* | 9/2001 | Wright ............ F01L 9/04 123/90.11 |
| 6,330,877 B1 | 12/2001 | Nordin | |
| 6,336,355 B1 | 1/2002 | Sasaki et al. | |
| 6,550,311 B2 | 4/2003 | Sloboda | |
| 6,598,468 B2 | 7/2003 | Zur Loye et al. | |
| 6,662,781 B1 | 12/2003 | Torno et al. | |
| 6,814,054 B2 | 11/2004 | Sauler et al. | |
| 6,862,517 B2 | 3/2005 | Galtier | |
| 6,885,932 B2 | 4/2005 | Liu et al. | |
| 6,912,460 B2 | 6/2005 | Sauler et al. | |
| 6,947,829 B2 | 9/2005 | Honda | |
| 6,978,771 B2 | 12/2005 | Kuzuyama et al. | |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,181,338 B2 | 2/2007 | Takemura et al. | |
| 7,191,658 B2 | 3/2007 | Oda et al. | |
| 7,212,909 B2 | 5/2007 | Yoshino et al. | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,816 B2 | 6/2008 | Zurlo | |
| 7,444,231 B2 | 10/2008 | Ancimer et al. | |
| 7,444,236 B2 | 10/2008 | Wiles | |
| 7,448,254 B2 | 11/2008 | Kurtz et al. | |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Jin et al. | |
| 7,669,582 B2 | 3/2010 | Huang | |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 8,000,884 B2 | 8/2011 | Aso et al. | |
| 8,032,293 B2 | 10/2011 | Binder et al. | |
| 8,069,972 B2 | 11/2011 | Auclair et al. | |
| 8,078,389 B2 | 12/2011 | Huang et al. | |
| 8,079,261 B2 | 12/2011 | Crickmore et al. | |
| 8,108,131 B2 | 1/2012 | Huang et al. | |
| 8,155,857 B2 | 4/2012 | Loeffler et al. | |
| 8,250,905 B2 | 4/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,359,909 B2 | 1/2013 | Duval et al. | |
| 8,396,649 B2 | 3/2013 | Huang | |
| 8,429,955 B2 | 4/2013 | Taglialatela Scafati et al. | |
| 9,874,488 B2* | 1/2018 | Bizub ................ F02B 77/085 |
| 9,915,217 B2* | 3/2018 | Bizub ................ F02D 35/027 |
| 9,933,334 B2* | 4/2018 | Rivellini ............ G01M 15/05 |
| 2004/0267430 A1 | 12/2004 | Ancimer | |
| 2005/0027433 A1* | 2/2005 | Panciroli ............ F01L 9/02 701/111 |
| 2005/0086999 A1 | 4/2005 | Subramanian et al. | |
| 2007/0277780 A1 | 12/2007 | Akazaki et al. | |
| 2008/0051975 A1 | 2/2008 | Ker et al. | |
| 2008/0053405 A1 | 3/2008 | Vigild et al. | |
| 2008/0133177 A1 | 6/2008 | Klenk et al. | |
| 2009/0048729 A1 | 2/2009 | Waters et al. | |
| 2010/0326170 A1 | 12/2010 | Schneider et al. | |
| 2012/0022762 A1 | 1/2012 | Rosero | |
| 2012/0047997 A1 | 3/2012 | Esteghlal et al. | |
| 2012/0053818 A1 | 3/2012 | Sackmann et al. | |
| 2012/0266844 A1 | 10/2012 | Hagari et al. | |
| 2013/0006505 A1 | 1/2013 | Shinagawa et al. | |
| 2013/0047956 A1 | 2/2013 | Davis | |
| 2013/0096809 A1 | 4/2013 | Haeming et al. | |
| 2013/0060447 A1 | 5/2013 | Guerrassi et al. | |
| 2013/0125633 A1 | 5/2013 | Mair et al. | |
| 2016/0187219 A1* | 6/2016 | Bizub ................ G01L 23/221 702/191 |
| 2016/0187220 A1* | 6/2016 | Bizub ................ G01L 23/221 73/35.09 |
| 2016/0290884 A1* | 10/2016 | Bizub ................ F02B 77/085 |
| 2016/0298553 A1* | 10/2016 | Angeby ............ F02D 35/027 |

FOREIGN PATENT DOCUMENTS

| | | |
|---|---|---|
| EP | 709662 | 1/1996 |
| EP | 801294 | 10/1997 |
| EP | 889309 | 7/1999 |
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| JP | 20110256833 | 12/2011 |
| WO | WO1997038292 | 10/1997 |
| WO | WO2004016924 | 2/2004 |
| WO | WO2008000568 | 1/2008 |
| WO | WO2008059376 | 5/2008 |
| WO | WO2009106557 | 9/2009 |
| WO | WO2013015372 | 1/2013 |

(56) References Cited

FOREIGN PATENT DOCUMENTS

| | | |
|---|---|---|
| WO | WO2013026950 | 2/2013 |
| WO | WO2013118151 | 8/2013 |

OTHER PUBLICATIONS

U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
Reduction Piston Slap Excitation by Optimizing Piston Profiles; Takayuki Koizumi et al.; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements;Takeshi Nakahara et al; Proc. of SPIE 5391, Smart Struc. & Materials, Jul. 2004.
Vulli et al., "Time-Frequency Analysis of Single-point Engine-Block Vibration Measurements for Multiple Excitation Event identification". Journal of Sound and Vibration vol. No. 321, Issue No. 3-5, pp. 1129-1143, Apr. 10, 2009.
European Search Report and Opinion issued in Connection with Corresponding EP Application No. 16153229.6 dated Jun. 15, 2016.

\* cited by examiner

SYSTEM AND METHOD FOR VALVE EVENT DETECTION AND CONTROL

BACKGROUND

The subject matter disclosed herein relates to valve event detection and control.

Combustion engines will typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or move valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power. It would be beneficial to improve valve event detection and control.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an engine control system configured to control an engine. The engine control system comprises a processor configured to receive a vibration signal sensed by a knock sensor disposed in an engine. The processor is further configured to correlate the vibration signal with a fingerprint having at least an ADSR envelope indicative of the operating event of a valve train of the combustion engine, analyze the vibration signal with a statistical valve train model, or a combination thereof. The processor is also configured to detect if the operating event has occurred based on correlating of the noise signal with the fingerprint, based on analyzing the vibration signal with a statistical valve train model, or a combination thereof, and to control the valve train based on the operating event.

In a second embodiment, a method includes receiving a vibration signal sensed by a knock sensor disposed in an engine, and correlating the vibration signal with a fingerprint having at least an ADSR envelope indicative of the operating event of a valve train of the combustion engine, analyze the vibration signal with a statistical valve train model, or a combination thereof. The method additionally includes detecting if the operating event has occurred based on correlating of the noise signal with the fingerprint, based on analyzing the vibration signal with a statistical valve train model, or a combination thereof, and controlling the valve train based on the operating event.

In a third embodiment, a tangible, non-transitory computer readable medium storing code is configured to cause a processor to receive a vibration signal sensed by a knock sensor disposed in an engine, and to correlate the vibration signal with a fingerprint having at least an ADSR envelope indicative of the operating event of a valve train of the combustion engine, analyze the vibration signal with a statistical valve train model, or a combination thereof. The tangible, non-transitory computer readable medium storing code is configured to additionally cause the processor to detect if the operating event has occurred based on correlating of the noise signal with the fingerprint, based on analyzing the vibration signal with a statistical valve train model, or a combination thereof, and to control the valve train based on the operating event.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
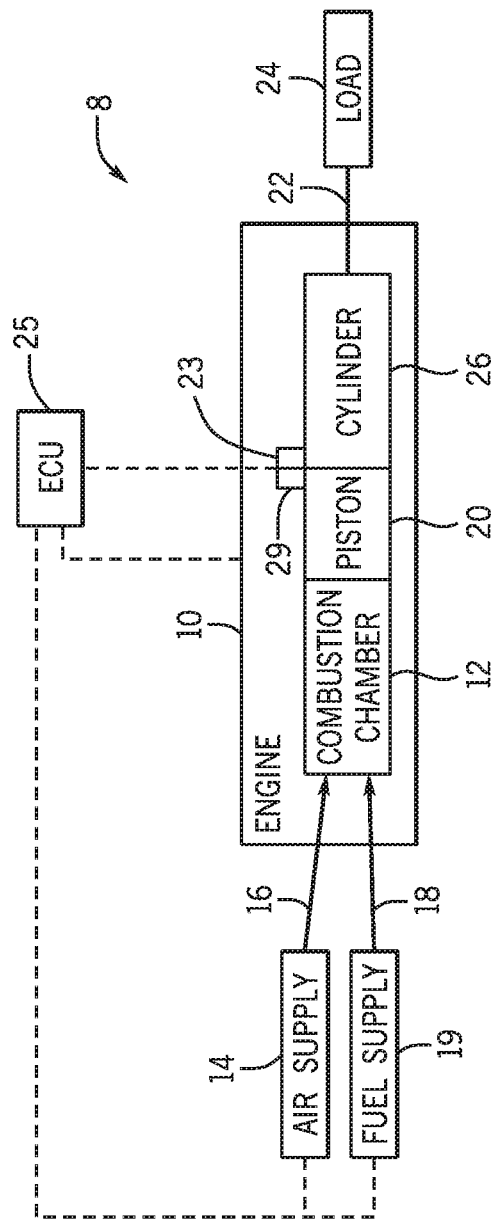
FIG. 1 is a block diagram of an embodiment of a portion of an engine driven power generation system in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein include the use of one or more knock sensor systems and methods that may detect certain valve events and conditions and then respond via active control of valve timing and/or lift. For example, knowledge or information derived via knock sensor signal processing as described herein to detect valve lash being set incorrectly may be used to correct the issue via variable valve timing and/or valve lifting. For instance, a corrective action may include adjusting lifter height on a hydraulic lifter by modifying feed pressure to the lifter. Likewise, electronic valve actuation may be executed to dynamically adjust valve timing. Corrective action would allow the engine to operate as intended. Accordingly, engine knock, excessive peak cylinder pressure imbalance, and other issues stemming from misadjusted valves may be corrected. By adjusting for certain valve conditions, engine operations may be more efficient and maintenance schedules may be improved.

It may first be useful to describe the use of knock sensors to detect certain non-knocking engine events. When using a knock sensor to monitor a combustion engine, occasionally the knock sensor system records a noise, such as an abnormal or undesired noise that may not be identified at that time. Alternatively, the knock sensor may record a noise that is a normal or desired noise, where the noise has been previously identified and characterized. For example, noises emitted by the combustion engine during various actions by the combustion engine may be initially characterized during an in-factory baselining process. Noise signals for particular operating events and conditions (e.g., valve closures, valve openings, and peak firing pressure, valve sticking, valve disconnection, excessive valve timing drift, excessive valve seating velocity, complete valve lash consumption in operation, valve leaking) during the baselining process may be processed and stored in a database as relating to one or more operating events. During normal operation of the combustion engine, data stored in the database relating to the operating events characterized during the baselining process may be accessed to determine if operational noise corresponds to the operating events characterized during the baselining process.

In one embodiment, the techniques described herein may create a sound "fingerprint" of certain engine sounds or noise. The fingerprint (e.g., profile, comparator, and/or reference signal) may be developed during the baselining process, as described above, and the fingerprint may correspond to a particular operating event (e.g., a valve closure) tested during the baselining process. Other valve events for fingerprinting include valve sticking, valve disconnection, excessive valve timing drift, excessive valve seating velocity, complete valve lash consumption in operation, valve leaking, and so on. It should be noted that the baselining process may be carried out during full operation of the combustion engine or while only operating certain components (e.g., the components relating to the operating event(s) being baselined) of the combustion engine. For example, in some embodiments, various operating events of the combustion engine may be baselined in-factory during part or full operation.

During full operation of the combustion engine (e.g., after baselining), noise may be detected by the knock sensor, and the noise signal may be processed and compared to various fingerprints (e.g., profiles, signatures, comparators, reference signals, unique indicia, unique representations, etc.) relating to the combustion engine. If the fingerprint and the processed noise signal correspond or correlate (e.g., "match"), the signal may be confirmed as corresponding to the operating event relating to the fingerprint. The noise signal may also be processed to determine time-sensitive information relating to the operating event that corresponds to the matched fingerprint and noise signal. For example, if the noise signal matches a fingerprint corresponding to closure of an exhaust valve, the noise signal may be plotted with respect to time (or crank angle) to determine when the exhaust valve closed.

As described in further detail below, systems and method are provided for identifying and classifying noise via an Attack-Decay-Sustain-Release (ADSR) envelope and/or joint time-frequency techniques, where the ADSR envelope may correspond to at least a portion of the above-referenced fingerprint. The joint time-frequency techniques may include cepstrum techniques, quefrency techniques, chirplet techniques, and/or wavelet techniques to develop an acoustic model or fingerprint of the noise, as described in more detail below.

The techniques described herein further include the use of one or more knock sensor systems and methods that may detect a dynamic response of a cylinder head caused by intake valve and exhaust valve seating excitation. Valve excitation may occur as a valve, such as a conic or circular valve, "seats" or otherwise closes a cylinder chamber with certain valve portions seating before others. Advantageously, the techniques described herein include the retrofit of existing systems, such as upgrading an existing engine control unit (ECU) or engine control module (ECM), to use existing knock valve systems to derive intake valve and/or exhaust valve conditions, including a derivation of variations in valve timing for each cylinder of a combustion or reciprocating engine. Such derivations may be used to further derive certain valve conditions, such as stuck valves, disconnected valve stems, valve train structural failure, and so on, and thus may be used to improve engine maintenance and overall operations. Accordingly, valve timing may be monitored by observing cylinder head acceleration measurement, via, for example, a knock sensor, for remote valve train diagnostics.

In one embodiment, the techniques described herein may detect a timing drift of cylinder head response due to the valve seating excitation in order to derive a drift of the valves' closing phase due to, for example, a valve lash (e.g. clearance or gap in a valve train between camshaft and the valve) variation or a valve stem disconnection. The detection of the timing drift may include using statistical techniques, as described in further detail below, useful in analyzing knock sensor data using a variety of sensors, including standard knock sensors positioned to detect engine knocking. Accordingly, the retrofit may apply a software update (e.g., flash update) and may not involve hardware changes. Acceleration sensors can measure a cylinder head dynamic response due to valve seating excitation. A trigger Crank Angle (CA) of the signal determines the actual valve closing event and can be correlated to valve lash in operation. Variation of the trigger CA allows a determination of variation in actual valve closing time. This determination can be used to detect at least two types of failure modes: 1) lash variation in operation, resulting in slow drift over time of trigger CA, e.g., valve wear progression (wear=lash adjustment–lash in operation), loosen adjusting screw, variation in valve train components thermal expansion; and 2) valve train failure, e.g., resulting in sudden valve timing variation; independently from the valve lash in operation, including valve disengagement, connecting rod breakage, and so on. The techniques described herein include results independent from a type of acceleration sensor used (e.g., piezoelectric, charge accelerometer) and position of the acceleration sensor on a cylinder head (e.g., sensor may be used in one or more cylinder head studs).

Accordingly, the techniques described herein may provide for remote and local detection of certain undesired valve events, such as a valve train events. The techniques described herein may additionally include systems and method for controlling engine operations once the undesired valve events (e.g., valve sticking, valve disconnection, excessive valve timing drift, excessive valve seating velocity, complete valve lash consumption in operation) are detected.

Turning now to FIG. 1, the figure illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). A top portion of the combustion chamber 12 may be formed via a cylinder head 14. Though FIG. 1 shows a combustion engine 10, it should be understood that any reciprocating device may be used. An air supply is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may be any sensor configured to sense vibrations caused by the engine 10, such as vibration due to detonation, pre-ignition, and or pinging. Multiple knock sensors 23 are used, just as there are multiple pistons 20 and cylinders 26. The knock sensor(s) 23 is shown communicatively coupled to a controller, engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain vibrations should be further analyzed and categorized to detect, for example, undesired engine conditions. The ECU 25 may then actuate certain devices, such as a valve adjustment device 27 and/or a camless valve actuator 31 that may be included in a valve train 70 further described below, to adjust valve operations.

Figure 2:
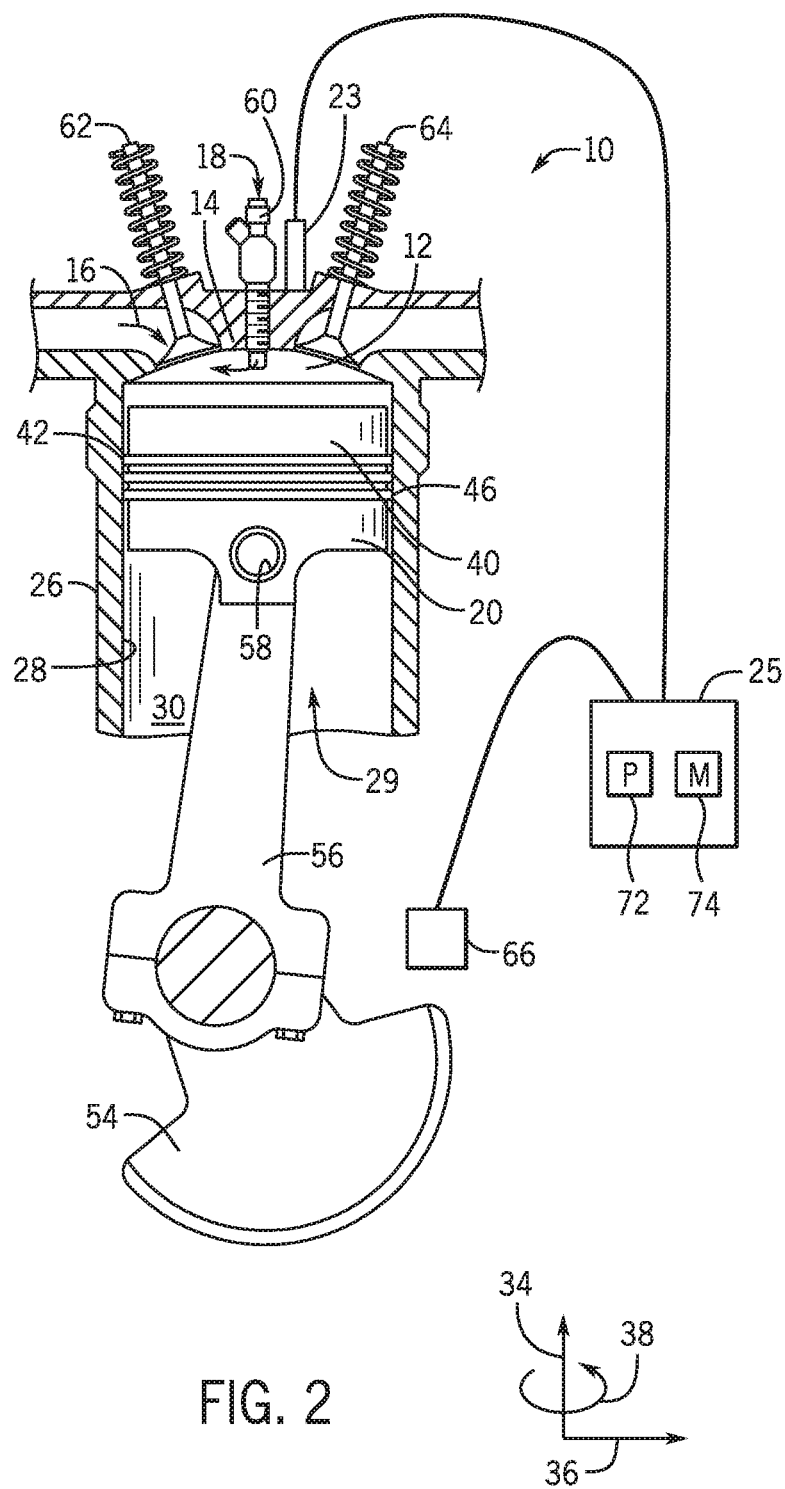
FIG. 2 is a side cross-sectional view of an embodiment of a piston assembly within a cylinder of the reciprocating engine shown in FIG. 1 in accordance with aspects of the present disclosure.

FIG. 2 is a side cross-sectional view of an embodiment of a piston assembly 29 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 also includes a crankshaft sensor 66, the knock sensor 23, and the engine control unit (ECU) 25, which includes a processor 72 and memory 74. The crankshaft or crank angle sensor 66 senses the position and/or rotational speed of the crankshaft 54. Accordingly, a crank angle or crank timing information may be derived via then crankshaft sensor 66. That is, when monitoring combustion engines, timing is frequently expressed in terms of crankshaft 54 angle. For example, a full cycle of a four stroke engine 10 may be measured as a 720° cycle. The knock sensor 23 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 23 may not be a knock sensor, but any sensor that may sense noise, vibration, pressure, acceleration, deflection, and/or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23. The crankshaft sensor 66 and the knock sensor 23 are shown in electronic communication with the engine control unit (ECU) 25. The ECU 25 includes a processor 72 and a memory 74. The memory 74 may store computer instructions that may be executed by the processor 72. The ECU 25 monitors and controls and operation of the engine 10, for example, by adjusting combustion timing, valve 62, 64, timing, valve lash distance, adjusting the delivery of fuel and oxidant (e.g., air), and so on.

Figure 3:
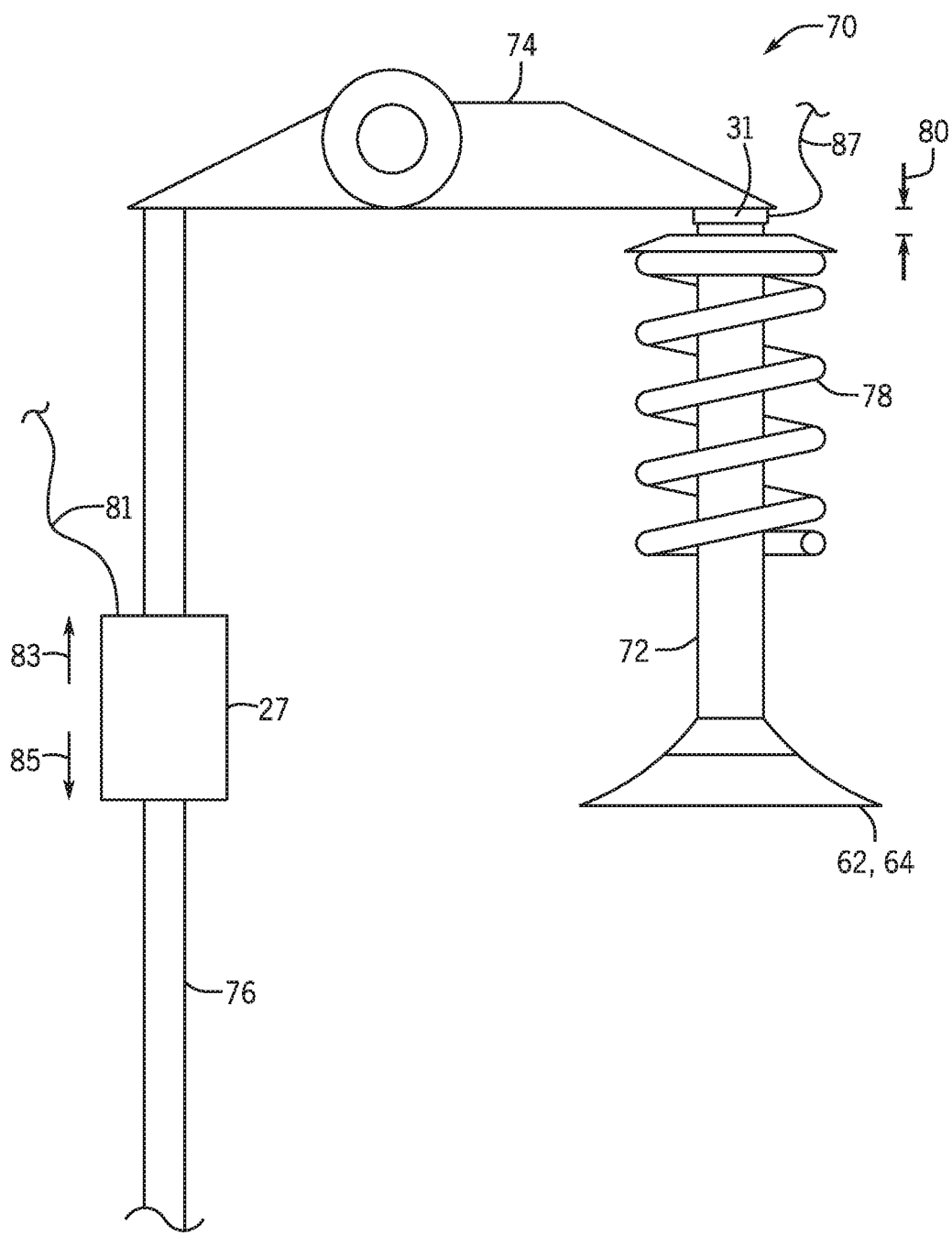
FIG. 3 is a block diagram of an embodiment of a valve train having a valve lash and certain valve timing and valve adjusting devices.

Turning now to FIG. 3, an embodiment of a valve train 70 is depicted. The valve train 70 includes either one of the valves 62, 64 having a valve stem 72. The valve stem 72 (e.g., tappet or "stultze") may be mechanically coupled to a rocker arm 74, which may move (e.g., open or close) the valve 62, 64 during operations of the engine 10. A rod 76 is also shown mechanically coupled to the rocker arm 74 and suitable for connecting the rocker arm to the engine 10, thus transferring motive force into the valve train 70. A spring 78 is also depicted, which provides a bias force to the valve 62, 64 to aid in opening and/or closing of the valve 62, 64. A valve lash (e.g., clearance or distance) 80 between the valve stem 72 and the rocker arm 74 is illustrated. During operations, the valve lash 80 may "drift" or otherwise increase or decrease in size. The techniques described herein may use the knock sensor(s) 23 to derive and analyze valve lash 80 drift over time, and to derive and analyze other valve train 70 properties, and may provide for a dynamic control approach to valve train 70 where the valve train 70 may be adjusted based on a derived lash, for example.

In one embodiment, the valve lash 80 may be adjusted via the valve adjustment device 27, such as a variable valve lifter. The variable valve lifter may be a discrete valve lifter The valve adjustment device 27 and the camless valve actuator 31 may be operatively coupled to the ECU 25 via a conduits 81 and 87 (e.g., wired conduit, wireless conduit). The valve adjustment device 27 may dynamically change the rod 76 length by "lifting" up and/or moving down in directions 83, 85, respectively. Lengthening the rod 76 via the valve adjustment device 27 will shorten the valve lash 80, while shortening the rod 76 will lengthen the valve lash 80. Actuating the camless valve actuator 31 may aid in varying valve 62, 64 retarding and/or increasing valve timing.

Advantageously, it has been discovered that valve train 70 conditions (e.g., unadjusted valve lash, valve train 70 components excessive wear, valve leakage, and so on), may be derived based on signals from the knock sensor(s) 23. Two sets of techniques are described herein, suitable for deriving valve train 70 conditions. A first set of techniques described in more detail below with respect to FIGS. 4-11 are directed at identifying and classifying noise via an Attack-Decay-Sustain-Release (ADSR) envelope and/or joint time-frequency techniques, where the ADSR envelope may correspond to at least a portion of the above-referenced fingerprint. The joint time-frequency techniques may include cepstrum techniques, quefrency techniques, chirplet techniques, and/or wavelet techniques to develop an acoustic model or fingerprint of the noise, as described in more detail below.

A second set of techniques described in more detail below with respect to FIGS. 12-16 is directed at certain statistical analysis of knock sensor 23 data. For example, a dynamic response of the cylinder head 14 caused by intake valve 62 and/or exhaust valve 64 seating excitation, may be detected by the knock sensor(s) 23 and used to derive a variety of valve train 70 conditions, including valve lash 80 drift. In one example, a magnitude (e.g., |F| where F is a frequency domain) and a phase (e.g., Φ(F)) of a dynamic response of the cylinder head 14 measured by one or more accelerometers in a crank angle range (e.g., between −720° to 720°) contain information regarding the valves 62, 64 seating excitation force and timing respectively. Triggered crank 54 angle of the absolute acceleration signal may be a robust information correlative to the valves' 62, 64 timing, which may be monitored during operations to detect long term valve lash 80 drift (e.g., drift after approximately 100, 500, 1000, 2000, 2500, 3000, or more operating hours) and sudden valve train events such as the stem 72 disconnection (e.g., between two consecutive cycles). Several types of models may then be derived to detect valve train 70 conditions (e.g., valve lash 80 drift, valve stem 72 disconnection).

The models may include one or more valve noise models that analyze valve knock sensor signals without considering triggered (e.g., opening) crank angle degree information. The models may additionally include triggered crank angle degree models that incorporate triggered crank angle degree information in addition to knock sensor(s) signals. The models (e.g., noise models and triggered crank angle modes) may be used individually or in combination, to derive the valve train conditions. Both sets of techniques, e.g., ADSR techniques and statistical techniques, may be used individually or combined to detect valve train 70 conditions (e.g., valve sticking, valve disconnection, excessive valve timing drift, excessive valve seating velocity, complete valve lash consumption in operation, valve leaking) and/or to derive control actions. The control actions include modulating or otherwise controlling the valve adjustment device 27 and/or camless valve actuator 31, applying variable valve timing techniques, applying ignition timing techniques, and so on.

Figure 4:
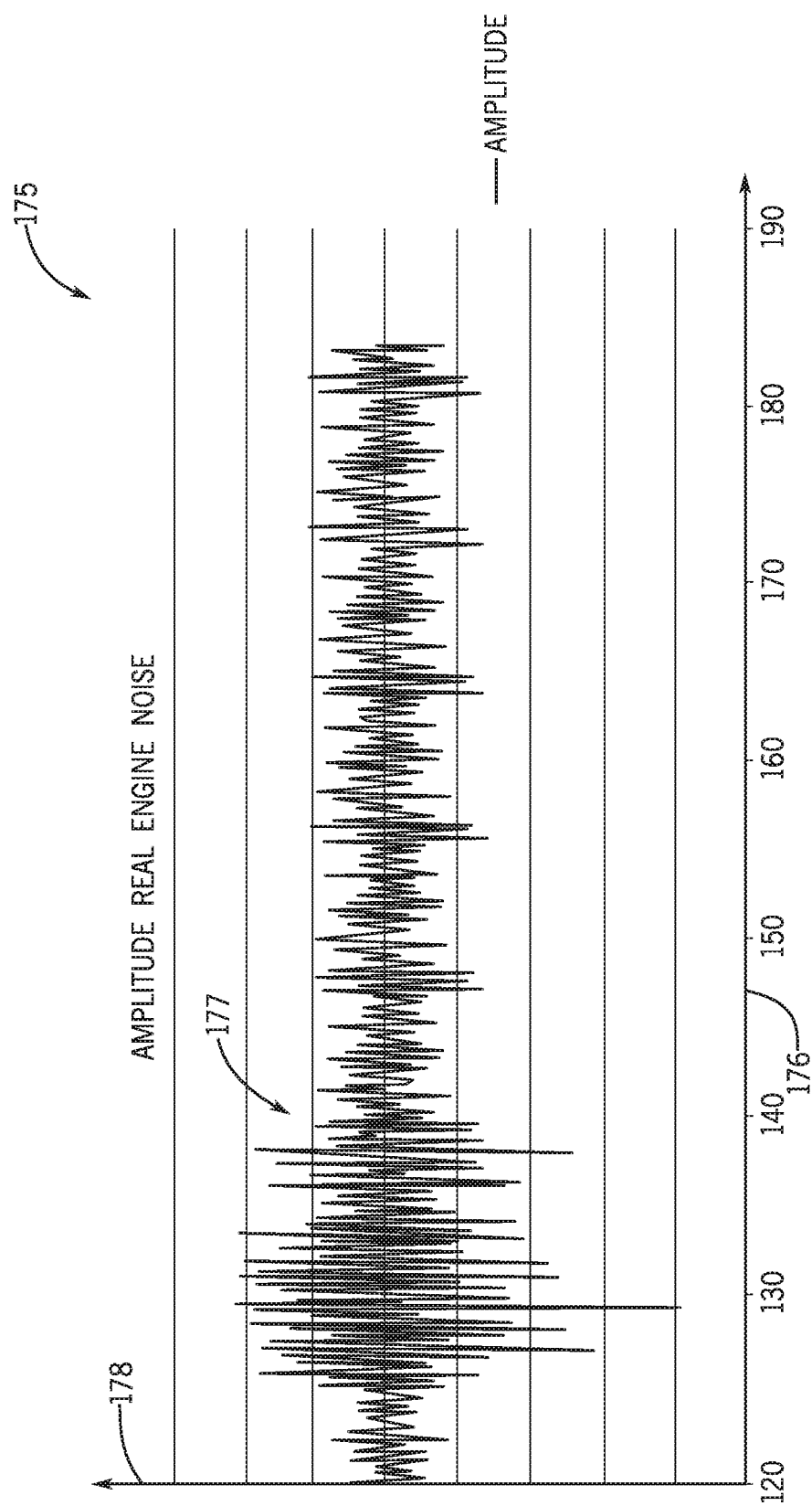
FIG. 4 is an embodiment of an engine noise plot of data measured by the knock sensor shown in FIG. 2 in accordance with aspects of the present disclosure.
Figure 6:
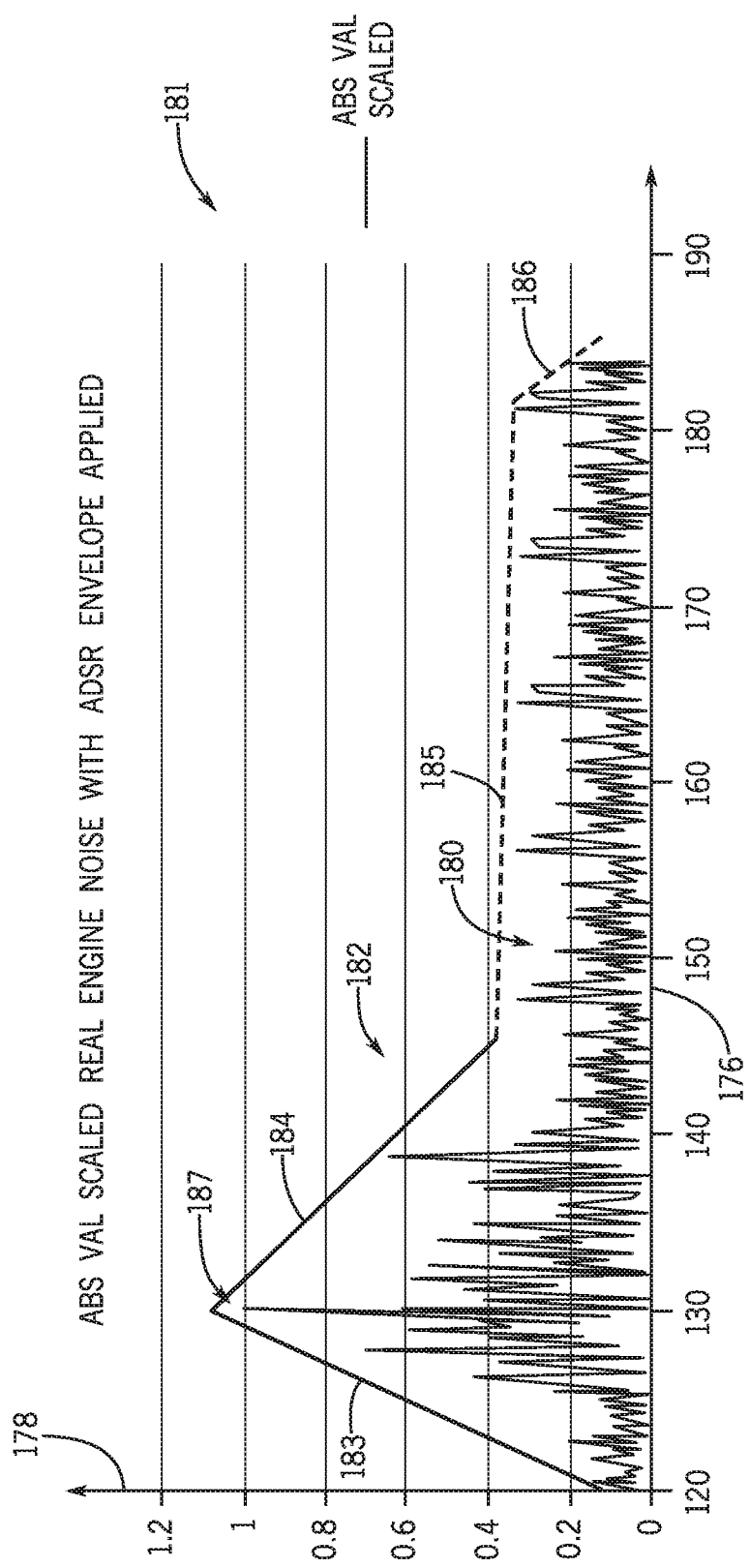
FIG. 6 is an embodiment of a sample scaled engine noise plot shown in FIG. 5 with four principle parameters of an attack, decay, sustain, release (ADSR) envelope overlaid in accordance with aspects of the present disclosure.
Figure 7:
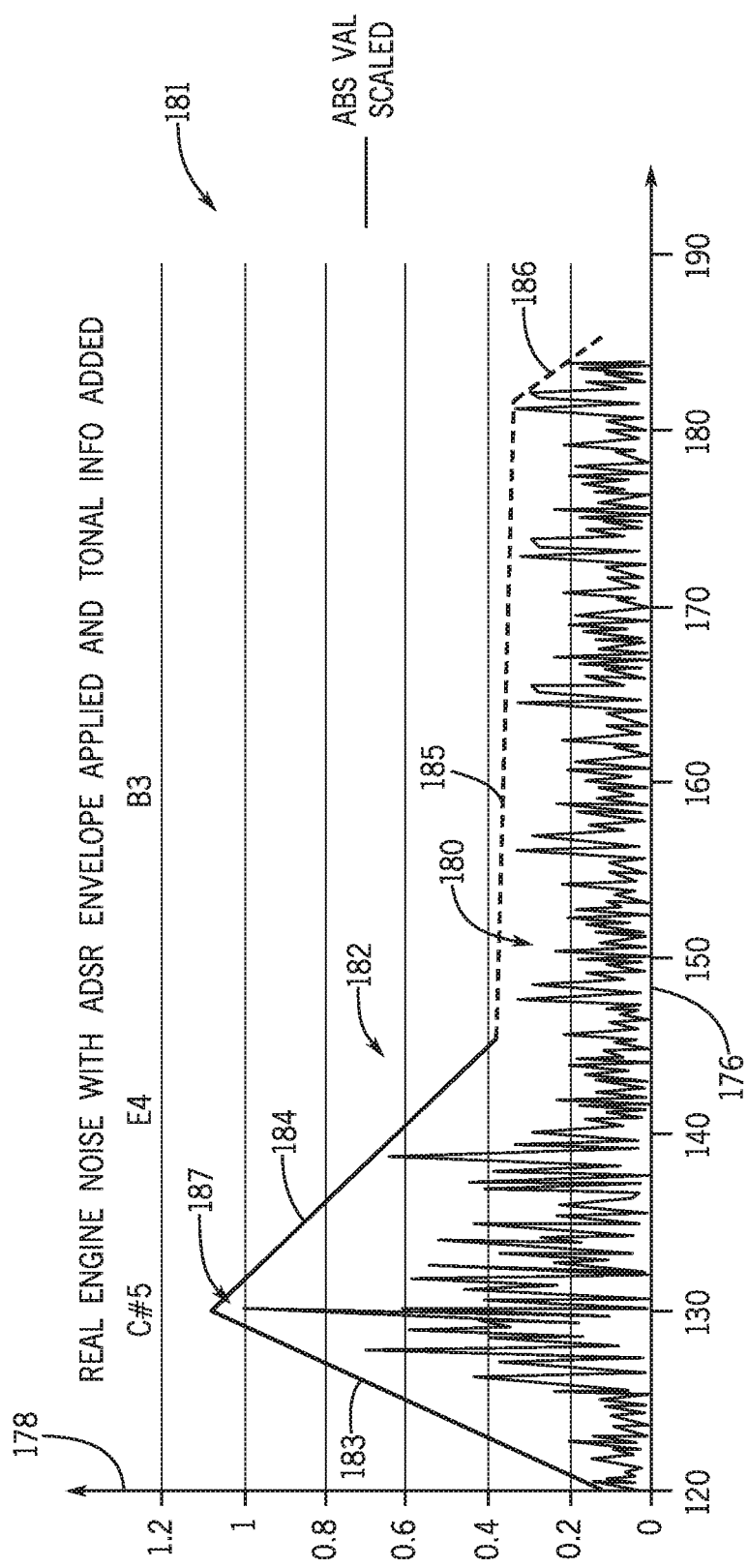
FIG. 7 is an embodiment of a scaled engine noise plot and ADSR envelope shown in FIG. 6 with the extracted tones overlaid in accordance with aspects of the present disclosure.
Figure 8:
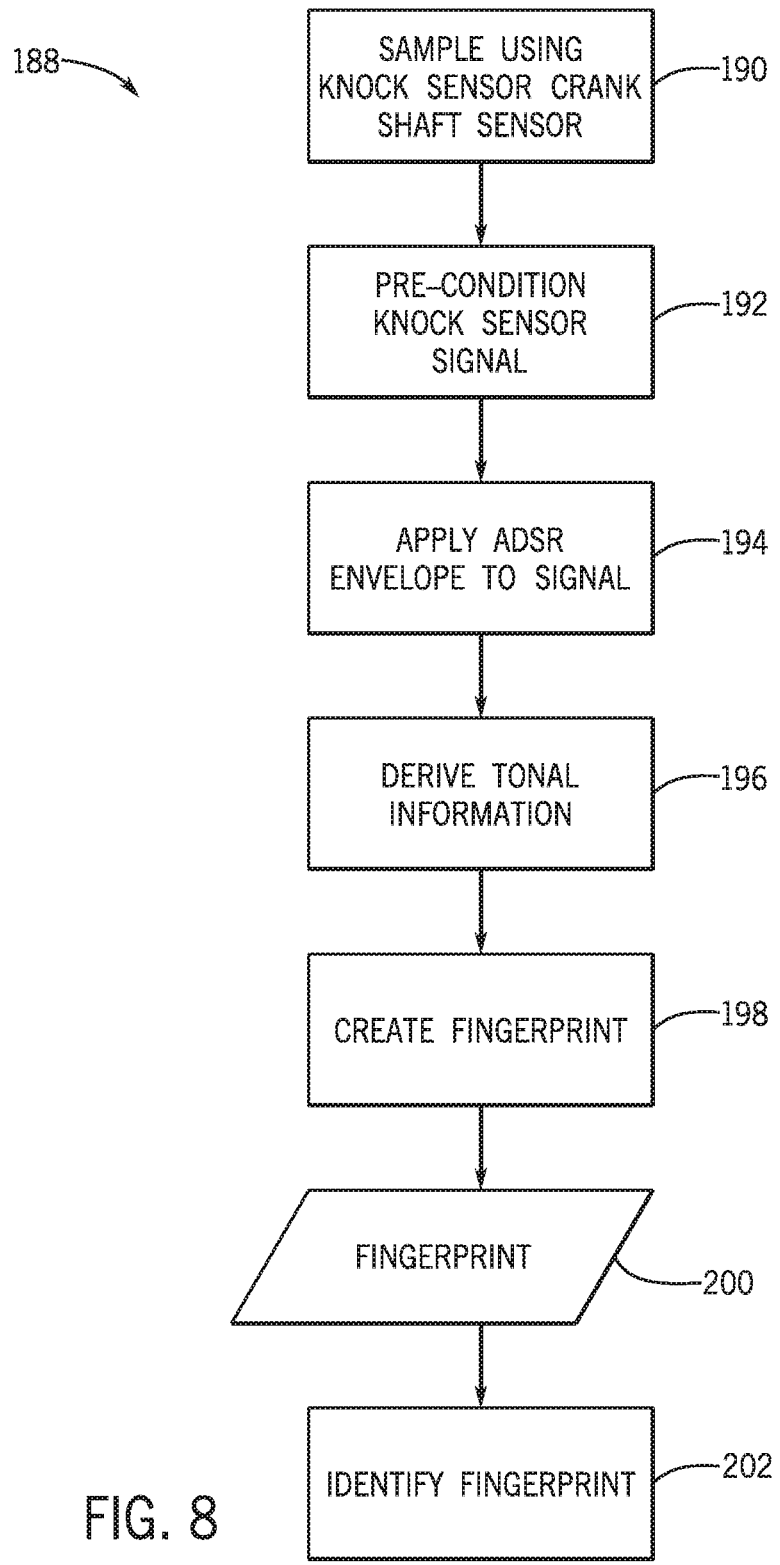
FIG. 8 is a flow chart showing an embodiment of a process for characterizing a noise in accordance with aspects of the present disclosure.
Figure 9:
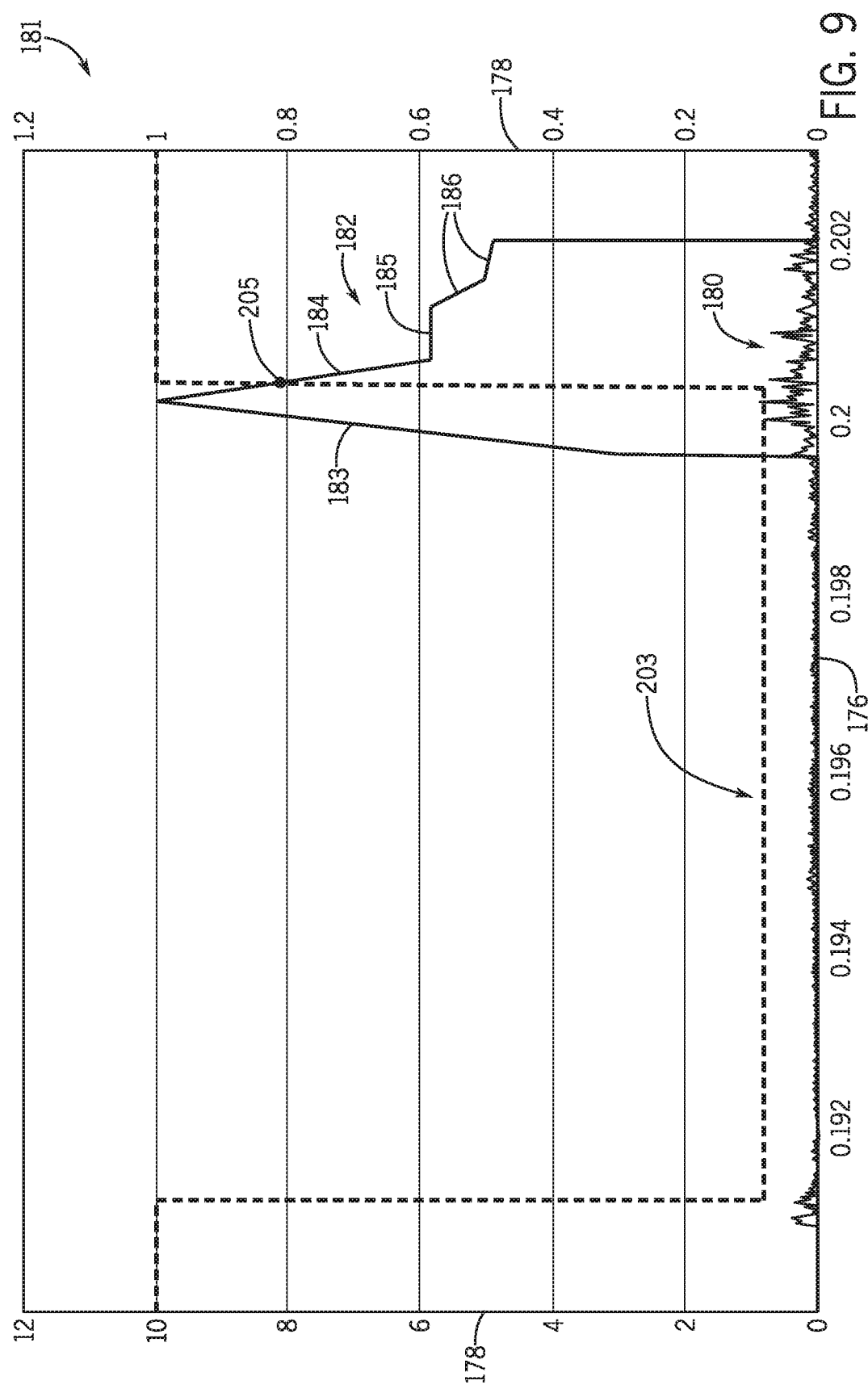
FIG. 9 is a an embodiment of a scaled engine noise plot corresponding to an engine operating event, an operating event indicator corresponding to the engine operating event, and an ADSR envelope corresponding to the engine operating event in accordance with the process of FIG. 8 and other aspects of the present disclosure.
Figure 10:
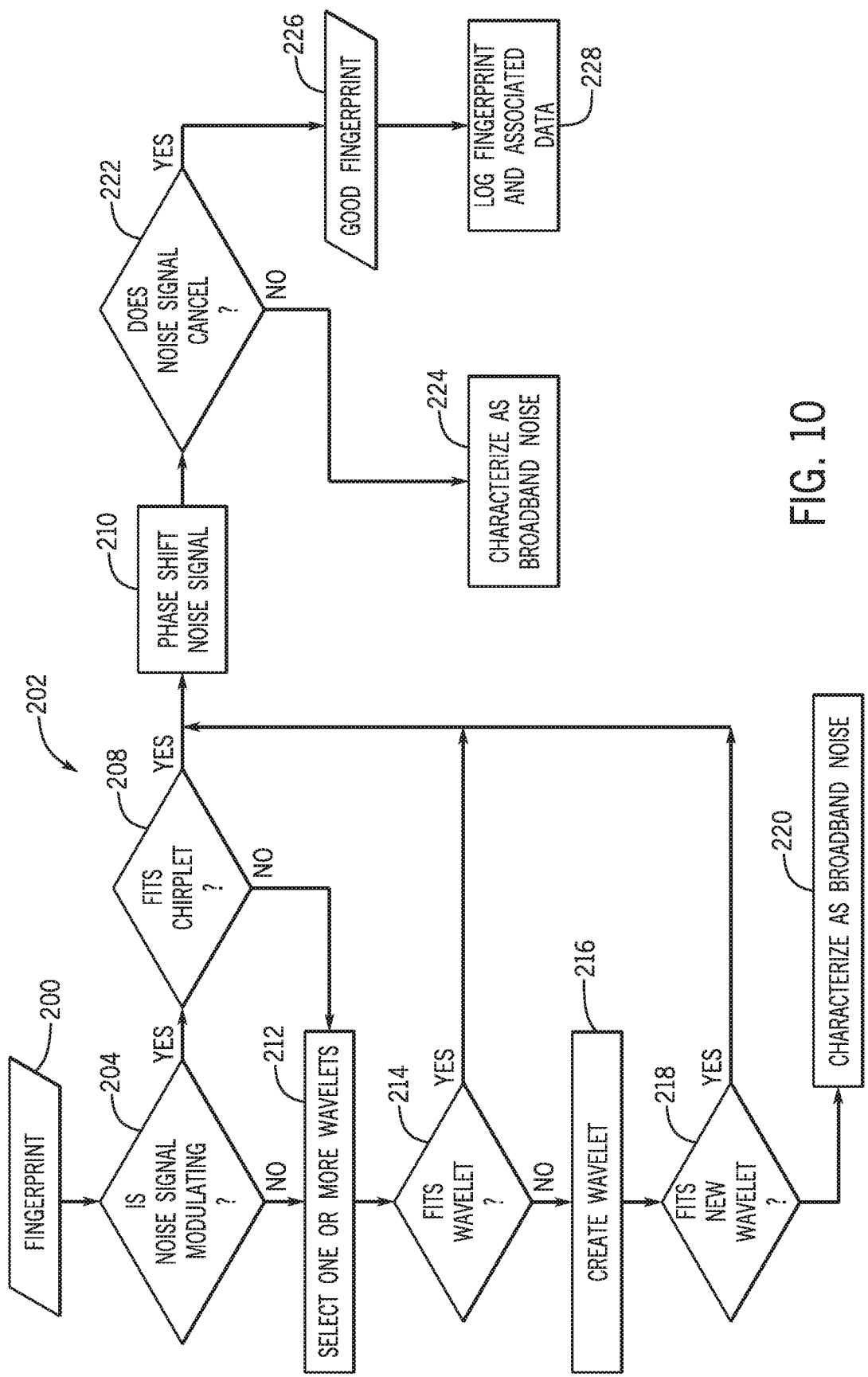
FIG. 10 is a flow chart showing an embodiment of a process for identifying a fingerprint shown in FIG. 8 in accordance with aspects of the present disclosure.
Figure 11:
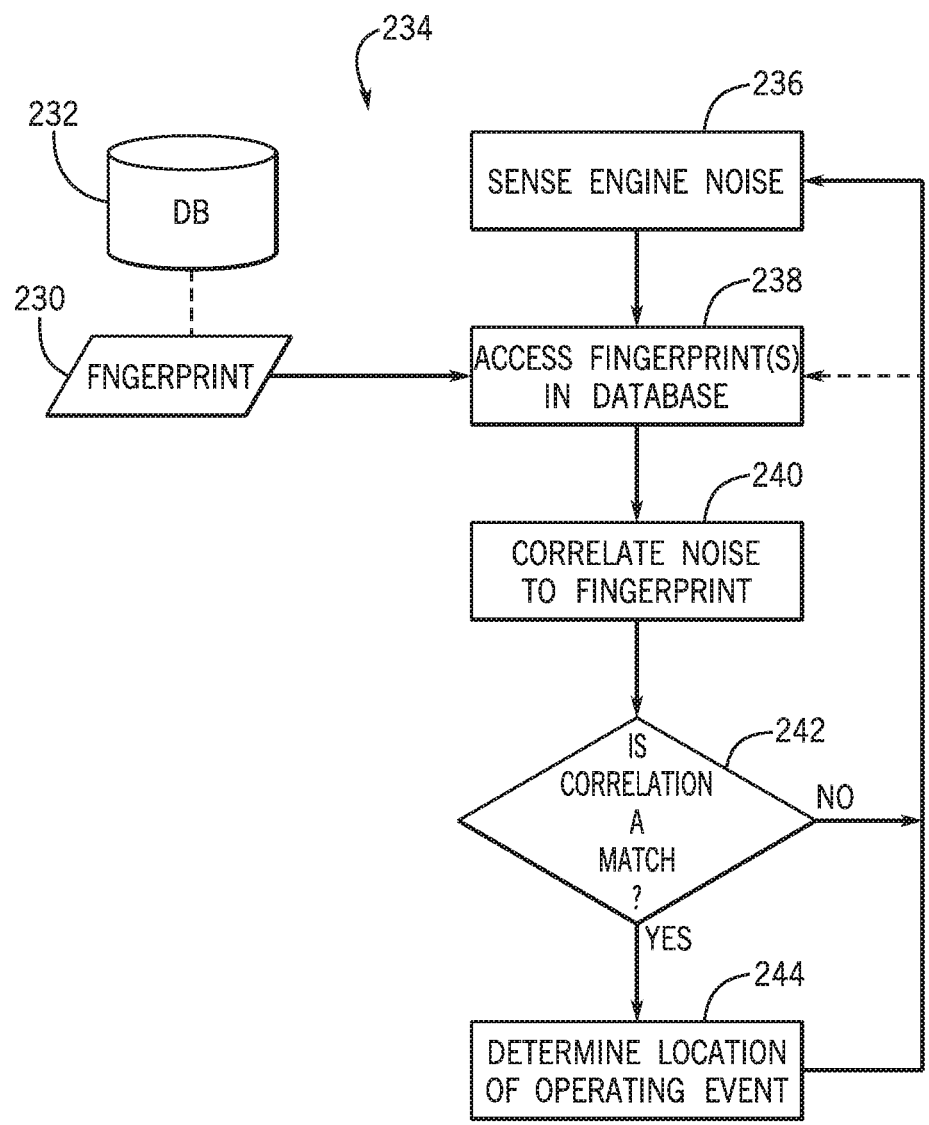
FIG. 11 is a flow chart of an embodiment of a process suitable for processing engine noise to derive certain engine operating events.

FIGS. 4-7 and 9 are illustrative of data that may be undergoing data processing, for example, via a process or processes described in more detail with respect to FIGS. 8 and 10. The data for FIGS. 4-7 and 9 may include data transmitted via the knock sensor 23 and the crankshaft sensor 66. For example, FIG. 4 is an embodiment of a raw engine noise plot 175 derived (e.g., by the ECU 25) of noise data measured by the knock sensor 23 in which x-axis 176 is crankshaft 54 position (e.g., crank angle), which is correlative of time. In accordance with present embodiments, the noise data may correspond to a particular operating event or action of the engine 10. For example, the noise data may correspond to opening or closing of a valve of the engine 10, for example, the exhaust valve 64. Alternatively, the noise data may correspond to peak firing pressure, which describes the highest pressure in the combustion chamber 12 during combustion.

The plot 175 is generated when the ECU 25 combines the data received from the knock sensor 23 and the crankshaft sensor 66 during operations of the engine 10. In the depicted embodiment, an amplitude curve 177 of the knock sensor 23 signal is shown, with an amplitude axis 78. That is, the amplitude curve 177 includes amplitude measurements of vibration data (e.g., noise, sound data) sensed via the knock sensor 23 plotted against crank angle. It should be understood that this is merely a plot of a sample data set (e.g., corresponding to closure of the exhaust valve 64), and not intended to limit plots generated by the ECU 25. The curve 177 may then be scaled for further processing, as shown in FIG. 5.

Figure 5:
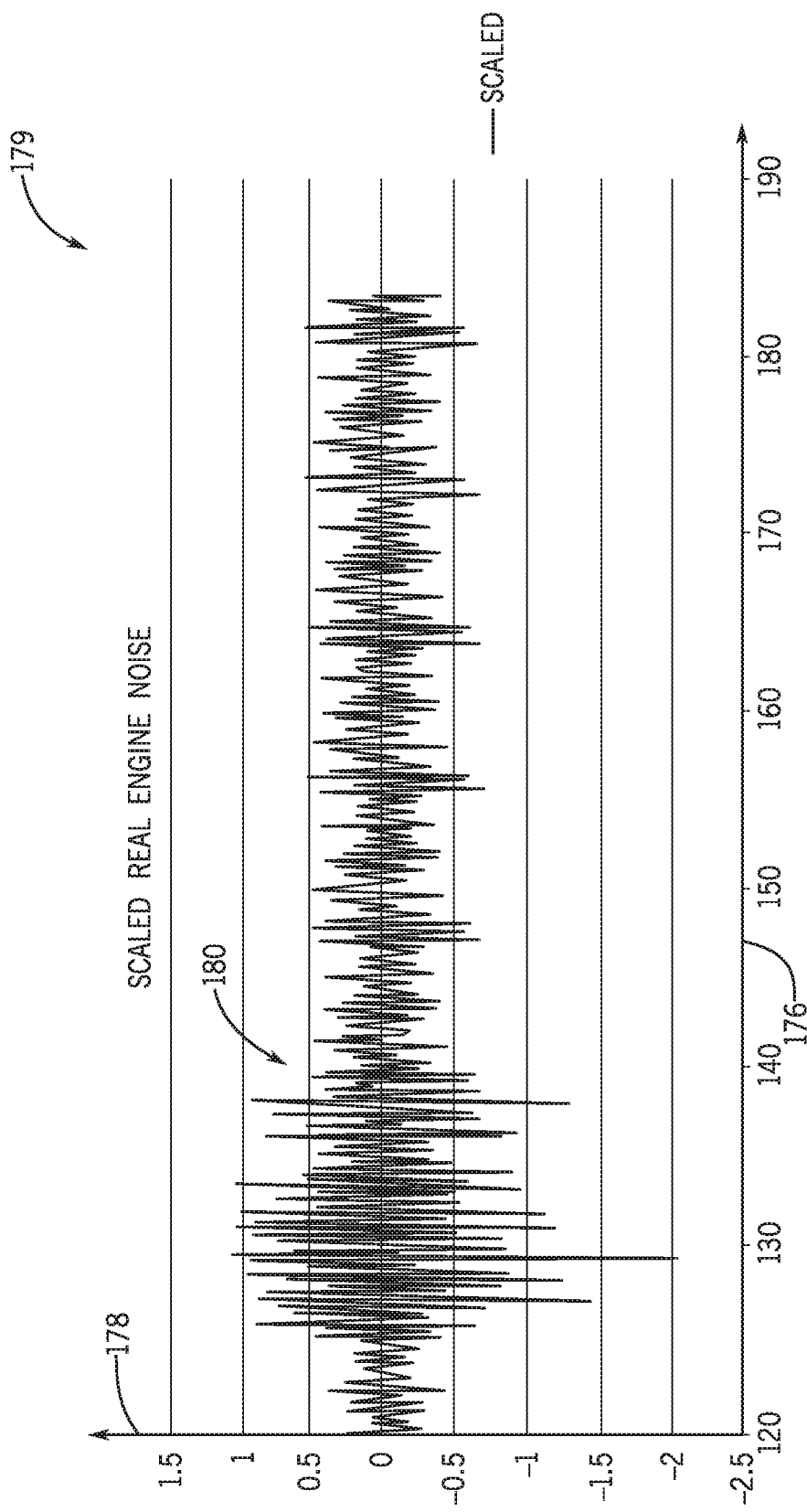
FIG. 5 is an embodiment of a scaled version of the sample engine noise plot shown in FIG. 4 in accordance with aspects of the present disclosure.

FIG. 5 is an embodiment of a scaled engine noise plot 179, which may be derived by the ECU 25. In the scaled plot 179, the raw engine noise from amplitude plot 175 shown in FIG. 4 has been scaled to derive a scaled amplitude curve 180. In this case, a single multiplier has been applied to each data point such that the maximum positive value of the scaled amplitude curve 180 is 1. Note that the multiplier applied to each point of curve 180 in order to produce a maximum positive value of 1 may result in negative values that are less than or greater than −1. That is, for example, the maximum negative value may be −0.5, or it may be −1.9, as shown in scaled engine noise plot 179 shown in FIG. 5.

FIG. 6 is an embodiment of a scaled engine noise plot 181 with four principle parameters of an attack, decay, sustain, release (ADSR) envelope 182 laid over the top of the plot. The ADSR envelope 182 is typically used in music synthesizers in order to mimic the sound of musical instruments. Advantageously, the techniques described herein apply the ADSR envelope 182 to knock sensor 23 data to more quickly and efficiently provide for certain noise analysis, as further described below. For example, the scaled curve 180 may be characteristic (or include characteristics) of a particular operating event (e.g., valve 62, 64 opening/closing or peak firing pressure in the combustion chamber 12) of the engine 10, and the ADSR envelope 182 developed for the scaled curve 180 may be utilized for future analysis of the operating event during operation of the engine 10.

The four principle parameters of the ADSR envelope are attack 183, decay 184, sustain 185, and release 186. The attack 183 occurs from the start of the noise to a peak amplitude 187 of the scaled curve 180. The decay 184 occurs in the run down from the peak amplitude to a designated sustain 185 level, which may be some specified percent of the maximum amplitude. It should be understood that the order of the four parameters does not have to be attack, decay, sustain, and release. For example, for some noises, the order may be attack, sustain, decay, and release. In such cases, an ADSR, rather than ADSR, envelope would be applied. For the sake of simplicity, this will be referred to as an "ADSR envelope," but it should be understood that the term applies to a noise regardless of the order of the parameters. The sustain 185 level is the main level during the noise's duration. In some embodiments, the sustain 185 level may occur at 55% of the maximum amplitude. In other embodiments, the sustain 185 level may be at least equal to or greater than 35%, 40%, 45%, 50%, 60%, or 65% of the maximum amplitude. A user, or the ECU 25, may check whether the sustain level is as desired by determining whether the sustain 185 level is held for at least 15% of the duration of the signature. If the sustain 185 lasts more than 15% of the duration of the signature, the sustain 185 level is set as desired. The release 186 occurs during the run down from the sustain 185 level back to zero. It should be noted that, in some embodiments, the noise signal (e.g., the scaled amplitude curve 180) may be filtered via a high-pass filter, a low-pass filter, or a band-pass filter to attenuate portions of the signal having frequencies uncharacteristic of the operating event. The particular filter applied to the noise signal may depend on the operating event being monitored. For example, when monitoring valve 62, 64 events (e.g., openings and closures), a high-pass filter (e.g., greater than 10 kilohertz (kHz)) or a band-pass filter (e.g., between 10 and 20 kilohertz (kHz)) may be applied to the noise signal. When monitoring combustion events (e.g., peak firing pressure), a low-pass filter (e.g., less than 2 kilohertz (kHz)) may be applied to the noise signal.

FIG. 7 shows the same scaled engine noise plot 179 shown in FIGS. 5 and 6 with certain tones overlaid (e.g., superimposed). After applying the ADSR envelope 182, the ECU 25 may extract three to five of the strongest frequencies in the noise and convert them into musical tones. For example, a lookup table mapping frequency ranges to musical tones may be used. Additionally or alternatively, equations may be used based on the observation that pitch is typically perceived as the logarithm of frequency for equal temperament systems of tuning, or equations for other musical temperament systems. In other embodiments, more or less frequencies may be extracted. In the plot 181 shown in FIG. 7 the three prominent (e.g., extracted) tones are C #5, E4, and B3. It should be understood, however, that these three tones are merely examples of possible tones and not intended to limit what tones may be present in a recorded noise.

FIG. 8 is a flow chart showing an embodiment of a process 188 for characterizing a noise, such as a noise sensed via the knock sensor 23. By characterizing the noise, the noise can be logged and sorted for analysis, including future analysis and/or real-time analysis. For example, in some embodiments, the process 188 may be used for characterizing a noise relating to a particular operating event or action of the engine 10, such as peak firing pressure or opening/closing of intake or exhaust valves 62, 64. Further, the noise may first be characterized during a baselining process (e.g., an in-factory baselining process) before the engine 10 is implemented for normal or full time operation, e.g., before being sold, deployed to a site, implemented at a site, etc. For example, before normal operation of the engine 10, various operating events (e.g., peak firing pressure, intake/exhaust opening/closing) may be tested by analyzing the noise emitted during the operating event(s) (and detected by the knock sensor 23), where the noise signals or ADSR envelopes 182 of the noise signals may be fingerprinted as relating to the operating events being tested, thus creating a baseline. The noise may be further characterized during baselining to detect valve sticking, valve disconnection, excessive valve timing drift, excessive valve seating velocity, complete valve lash consumption in operation, valve leaking, and so on. It should be noted that the process 188 (e.g., baselining process) may be utilized when the engine 10 is not fully operating to simplify processing of the noise signal. For example, the process 188 may be utilized while only opening or closing a valve (e.g., the exhaust valve 64 or the intake valve 82) to characterize the noise corresponding to the opening or closing of the valve (e.g., the exhaust valve 64 or the intake valve 82). In other embodiments, the process 188 may be utilized during partial or during full engine 10 operations.

In the illustrated embodiment, the process 188 may be implemented as computer instructions or executable code stored in the memory 74 and executable by the processor 72 of the ECU 25. In block 190, a sample of data is taken using the knock sensor 23 and the crankshaft sensor 66. For example, the sensors 66, 23 collect data of an operating event (e.g., closure of the exhaust valve 174) during baselining and then transmit the data to the ECU 25. As previously described, the process 188 may be a baselining process and may be carried out while only particular components of the engine 10 are operating. For example, the process 188 may be carried out while opening and/or closing the exhaust valve 64 (or intake valve 62), such that the noise emitted during, for example, closing of the exhaust valve 64 may be readily processed. Certain conditions (e.g., valve sticking, valve disconnection, excessive valve timing drift, excessive valve seating velocity, complete valve lash consumption in operation, valve leaking) may be purposefully set for baselining the conditions. The ECU 25 then logs the crankshaft 54 angles at the start of data collection and at the end of data collection, as well as the time and/or crankshaft angle at the maximum (e.g., amplitude 187) and minimum amplitudes. Indeed, the crankshaft 54 angle may be logged continuously during the baselining process, enabling continuous plotting of the noise data against crankshaft 54 angle.

In block 192, the ECU 25 preconditions the knock sensor 23 data. This block 192 includes plotting the raw knock sensor 23 data against crankshaft 54 position or angle (or, in some embodiments, against time). A sample raw engine noise plot was shown in FIG. 3 as the amplitude plot 175. This block 192 also includes scaling the raw engine noise data. To scale the data, the ECU 25 determines a multiplier that would result in a maximum amplitude of positive 1. It should be noted that the maximum negative value has no effect on multiplier selection. The ECU 25 then multiplies each data point (e.g., data point in amplitude curve 177) by the multiplier, to derive the scaled amplitude curve 180, as shown in FIG. 5. It should be understood that the scaled engine noise plot 179 in FIG. 5 showing the scaled amplitude curve 180 is merely an example and not intended to limit the scope of this disclosure to plots that look the same or similar to scaled engine noise plot 179.

In block 194, the ECU 25 applies the ADSR envelope 182 to the engine noise signal. The processing in this block was discussed in describing FIG. 6. The ADSR envelope 182 is used to divide a noise data set into four different parameters or phases (attack 183, decay 184, sustain 185, release 186). As previously discussed, it should be understood that the order of the four parameters does not have to be attack, decay, sustain, and release. For example, for some noises, the order may be attack, sustain, decay, and release, or any other possible order. For the sake of simplicity, this will be referred to as an "ADSR envelope," but it should be understood that the term applies to a noise regardless of the order of the parameters. Traditionally, the ADSR envelope 182 is used in the process of reproducing a musical sound like that of a trumpet. However, in the techniques described herein, the ADSR envelope may be used to categorize and characterize noises so they can be cataloged and sorted, either for later analysis, real-time analysis, or some other purpose. The four principle parameters of the ADSR envelope 182 are attack 183, decay 184, sustain 185, and release 186. The attack 183 occurs from the start of the noise to the peak amplitude 187. The decay 184 occurs in the run down from the peak amplitude 187 to a designated sustain 185 level, which is some specified percent of the maximum amplitude. The sustain 185 level is the main level during the noise's duration. In some embodiments, the sustain 185 level may occur at 55% of the maximum amplitude. In other embodiments, the sustain 185 level may be at least equal to or greater than 35%, 40%, 45%, 50%, 60%, or 65% of the maximum amplitude. A user, or the ECU 25, may check whether the sustain level is as desired by determining whether the sustain 185 level is held for at least 15% of the duration of the signature. If the sustain 185 lasts more than 15% of the duration of the signature, the sustain 185 level is set as desired. The release 186 occurs during the run down from the sustain 185 level back to zero. In block 194 the ECU 25 measures the time from zero to maximum amplitude 187 (the maximum amplitude should have a value of 1). The ECU 25 then measures the run down time from the maximum amplitude 187 to the designated sustain level 185. The ECU 25 then measures the level and time that the noise sustains. Finally, the ECU 25 measures the time it takes for the noise to run down from the sustain level 185 to zero. The ECU 25 then logs the ADSR vectors or segments defining the ADSR envelope 182.

In block 196, the ECU 25 derives tonal information (e.g., musical tones) from the data. This block was discussed in the description of FIG. 7. During this block, the ECU 25, extracts tonal information from the data, identifying, for example, the three to five strongest tones in the data. In another embodiment, any number of tones may be identified, e.g., 1, 2, 3, 4, 5, 6, 7, 8, 9, 10, or more tones. FIG. 7 shows three tones derived from the signal, C #5, E4, and B3. The ECU 25 may derive five or more tones from the data. Though FIG. 7 shows tones C #5, E4, and B3, it should be understood that these tones are examples and the ECU 25 may derive any tones from the data. The ECU 25 then logs the derived tonal information, which may include the frequency of the fundamental derived tones (i.e., the lowest frequency tones), the order of the fundamental derived tones, the frequency of the harmonic derived tones (i.e., tones with a frequency that is an integer multiple of the fundamental frequency), the order of the harmonic derived tones, and any other relevant tonal information.

In block 198, the ECU 25 creates a fingerprint 200 based upon the ADSR envelope 182 and the tonal information derived in blocks 194 and 196. The fingerprint 200 includes a characterization of the noise, breaking the noise up into its component parts (e.g., ADSR envelope 182 components 183, 184, 185, 186, which may help identify valve opening/closing events and/or peak firing pressure) and quantifying those parts so the noise can be cataloged, categorized, and sorted. At this point in the process, the fingerprint 200 is based mostly upon the ADSR envelope in block 194 and the tonal information derived in block 196.

In block 202, the fingerprint 200 is identified and checked. Using a number of techniques, which will be described later, the fingerprint 200 may be modified or added to and then checked again. It should be noted that, as previously described, the fingerprint 200 may be logged with reference to a particular operating event or action of the engine 10. For example, the process 188 may correspond to a baselining process that characterizes noise signals relative to particular operating events that may occur during operation of the engine 10. In particular, the noise signal detected during the process 188 may relate to peak firing pressure, closure or opening of the exhaust valve 64, closure or opening of the intake valve 62, or a combination thereof. The fingerprint 200 may be stored in the memory 74 of the ECU 25 as corresponding to the particular operating event or condition being tested (e.g., baselined).

In some embodiments, the process 188 (e.g., baselining process) may include one or more additional steps that further processes the noise signal or ADSR envelope 182 to provide additional information relating to the operating event (e.g., opening or closing of the exhaust or intake valves 64, 62) or action of the engine 10. For example, for clarity, FIG. 9 is an embodiment of a scaled engine noise plot 181 with a scaled amplitude curve 180 corresponding to an engine operating event (e.g. valve opening or closing event), an operating event indicator 203 corresponding to the engine operating event, and an ADSR envelope 182 corresponding to the engine operating event in accordance with the process of FIG. 8. It should be noted, as previously described, that the engine operating event and the corresponding plot 181 in FIG. 9 may be tested (e.g., baselined via the process 188) while the engine 10 is not fully operating. Thus, the fluctuations in the illustrated amplitude curve 180 occur at predictable times corresponding to the operating event, and enable simpler processing. In other words, in some embodiments, no components or operating events of the engine 10 may emit noise other than the components or operating events being tested (e.g., baselined). Additionally or alternatively, the noise signal may be filtered via a high-pass filter, a low-pass filter, or a band-pass filter to attenuate portions of the signal having frequencies uncharacteristic of the operating event. The particular filter applied to the noise signal may depend on the operating event being monitored. For example, when monitoring valve 62, 64 events (e.g., openings and closures), a high-pass filter (e.g., greater than 10 kilohertz (kHz)) or a band-pass filter (e.g., between 10 and 20 kilohertz (kHz)) may be applied to the noise signal. When monitoring combustion events (e.g., peak firing pressure), a low-pass filter (e.g., less than 2 kilohertz (kHz)) may be applied to the noise signal.

With reference to the process 188 shown in FIG. 8, the fingerprint 200 having the ADSR envelope 182 information shown in FIG. 9 (e.g., with the attack 183, decay 184, sustain 185, and release 186) may include additional information relating to the operating event being fingerprinted or baselined. For example, during the process 188 (e.g., baselining process), an operating event indicator 203 may also be plotted over the scaled/normalized engine noise plot 181. The operating event indicator 203, for example, may be a plot provided by a switch (e.g., limit switch) that modulates between high and low to indicate the operating event during the baselining process (e.g., process 188). For example, the switch may be actuated each time the operating event occurs during the baselining process. However, in general, the switch may not be included in the engine 10 during normal operation of the engine 10, as inclusion of both the switch and the knock sensor 23 may be redundant and expensive. Thus, the switch and the corresponding operating event indicator 203 may be used during the baselining process (e.g., process 188) to more accurately determine a location in the ADSR envelope 182 at which the operating event specifically occurs (e.g., within 2-4 degrees crankshaft 54 angle, depending on the operating event), such that the ADSR envelope 182 can be stored to the ECU 25 and later utilized during normal operation of the engine 10 to determine a crankshaft 54 angle or timing at which the operating event more specifically occurs within the ADSR envelope 182.

In the illustrated embodiment, the operating event is a closure of the exhaust valve 64 shown in FIG. 2. As the exhaust valve 64 closes, the switch is actuated, thereby causing the limit switch to move from low (e.g., low voltage) to high (e.g., high voltage). The switch transmits a signal of the operating event indicator 203 to the ECU 25, which may plot the operating event indicator 203 on the scaled engine noise plot 181. An intersecting point 205 between the operating event indicator 203 and the ADSR envelope 182 may be stored along with the fingerprint 200 corresponding to the operating event (e.g., the closure of the exhaust valve 64). In the illustrated embodiment, the intersecting point 205 is located at an approximate midpoint of the decay 184 vector (e.g., within 5-10 percent of a length of the decay 184 vector from the midpoint). In general, closing of the exhaust valve 64 occurs at the midpoint or mid-region of the decay 184 vector (e.g., where the mid-region is an area defined by 5-10 percent of a length of the decay 184 vector on either side of the midpoint of the decay 184 vector), and coordinates of the midpoint of the decay 184 vector can be calculated using a geometric midpoint relationship, e.g., $P_i=[(X_1+X_2)/2, (Y_1+Y_2)/2]$, where $P_i$ is the midpoint (and, thus, the intersecting point 105), $X_1$ and $X_2$ are the X coordinates along axis 176 at either end of the decay 184 vector, and $Y_1$ and $Y_2$ are the Y coordinates along axis 178 at either end of the decay 184 vector. It should be noted that axis 178 in the illustrated embodiment includes time, but, in another embodiment, the axis 178 may include crankshaft 54 angle (e.g., crank angle) information from the crankshaft sensor 66, which is correlative of time.

After determining the intersection point 205 (which, in the illustrated embodiment relating to closure of the exhaust valve 64, is the midpoint of the decay 184 vector of the ADSR envelope 182), the fingerprint 200 (e.g., having the ADSR envelope 182 information and the intersection point 205 information) may be stored for later analysis.

In some embodiments, it may be beneficial to check the fingerprint 200 to ensure that the fingerprint 200 is accurate and can be used to identify operating events during normal operation of the combustion engine 10. For example, FIG. 10 is a flow chart showing further details of an embodiment of process 202, which identifies and checks the fingerprint 200 depicted in FIG. 8. The process 202 may be implemented as computer instructions or executable code stored in the memory 74 and executable by the processor 72 of the ECU 25. In decision 204, the ECU 25 determines whether or not the noise signal is modulating (i.e., changing from one tone to another). If the signal is not modulating (decision 204), then the ECU 25 moves on to block 212 and attempts to find a matching wavelet. A wavelet, effectively a piece or component of a wave, is a wave-like oscillation with an amplitude that begins at zero, increases, decreases, or both, and then returns to zero. Wavelets can be modified by adjusting the frequency, amplitude, and duration, which makes them very useful in signal processing. For example, in continuous wavelet transforms, a given signal may be reconstructed by integrating over the various modified frequency components. Example "mother" wavelets include Meyer, Morlet, and Mexican hat wavelets. However, new wavelets may also be created if the mother wavelets do not fit.

If the sound is modulating (decision 204), the ECU 25 moves on to decision 208 and determines whether or not the noise signal fits a chirplet. A chirp is a signal in which the frequency increases or decreases with time. Just as a wavelet is a piece of a wave, a chirplet is a piece of a chirp. Much like wavelets, the characteristics of a chirplet can be modified, and then multiple chirplets combined (i.e., a chirplet transform), in order to approximate a signal. A chirplet may modulate (i.e., change frequency) upward or downward. In decision 208, the ECU 25 may adjust the modulation of chirplets in order to fit the chirplets to the noise signal. If the ECU 25, after adjusting the modulation of chirplets, can adjust chirplets to fit the noise signal, then the ECU 25 logs whether there was a chirplet that fit the signal, and if so, the first frequency of the chirplet, the second frequency of the chirplet, and the rate of chirplet modulation in frequency/(crank angle) or frequency per second. The ECU 25 then moves to block 210, in which the ECU 25 phase shifts the noise signal in order to check the fingerprint 200. In block 210, the ECU 25 creates a generated noise signal based upon the ASDR envelope 182 vectors or other components, extracted tonal information, and chirplet or wavelet fits. The ECU 25 then shifts (block 210) the generated signal, e.g., 180 degrees out of phase. If the characterization of the noise signal is correct, the phase-shifted generated noise signal should cancel out the noise signal.

If the noise signal does not fit a chirplet (decision 108), the ECU 25 moves on to block 212 and attempts to fit a wavelet to the noise signal. In block 212, the ECU 25 selects one or more wavelets that may fit the noise signal. The selected wavelet or wavelets may be a Meyer wavelet, a Morlet wavelet, a Mexican hat wavelet, or some other suitable wavelet. In decision 214, the ECU 25 determines whether or not the selected wavelet or wavelets fits the noise signal. If the selected wavelet fits (decision 214), the ECU 25 logs that there was a wavelet fit, the mother wavelet type, the first scale range of the wavelet, and the second scale range of the wavelet. If the wavelet fits (decision 214), the ECU 25 moves on to block 210, in which the ECU 25 phase shifts the noise signal in order to check the fingerprint 200. If one of the selected wavelets does not fit the noise signal (decision 214), the ECU 25 may move on to block 216 and create a wavelet. In decision 218, the ECU 25 determines if the newly created wavelet fits the noise signal. If the created wavelet fits (decision 218), the ECU 25 logs that there was a wavelet fit, the first scale range of the wavelet, and the second scale range of the wavelet. If the created wavelet fits the noise signal (decision 218), the ECU 25 moves on to block 210, in which the ECU phase shifts the noise signal in order to check the fingerprint 200. If the new wavelet does not fit (decision 218), the ECU 25 moves on to block 220 in which it characterizes the noise signal as broadband noise.

Returning now to block 210, if the ECU 25 finds a chirplet or wavelet that fits the noise signal, the ECU 25 may check the fit by attempting noise cancellation. Accordingly, in block 210, the ECU 25 creates a generated noise signal based upon the ASDR envelope 182 vectors or other components, extracted tonal information, and chirplet or wavelet fits. The ECU 25 then shifts (block 210) the generated signal by 180 degrees. The ECU 25 then determines (decision 222) whether the shifted signal cancels out the original noise signal within a desired residual tolerance. If the shifted signal cancels out (decision 222) the original noise signal within a desired residual tolerance, the ECU 25 determines that the fingerprint 200 is a "good" fingerprint 226 and moves on to block 228, in which the ECU 25 logs the coefficients and associated data, which may include the root mean squared (RMS) value of the signal, or the RMS error. The ECU 25 may log other data as well, including, but not limited to crankshaft angles at the beginning or end of the signal, ASDR envelope 182 vectors or other ADSR components, fundamental spectral tones, harmonic spectral tones, order of spectral tones, order of harmonic tones, whether a chirplet fit, the first chirplet frequency, the second chirplet frequency, the rate of chirplet modulation, whether a wavelet fit, the mother wavelet type, the first scale range of the wavelet, the second scale range of the wavelet, the maximum amplitude value and time, the minimum amplitude value and time, the RMS value of the signal, the RMS error of the signal against the generated signal, and whether or not the noise is classified as broadband noise. Further, as previously described, the ECU 25 may log the intersecting point 205 on the ADSR envelope 182, as shown in FIG. 9. This logged data, and other data logged by the ECU 25, allows the ECU 25 to characterize and categorize known noises (e.g., corresponding to certain operating events described in the present disclosure) so these noises can be stored on the memory component 74 of the ECU 25, perhaps transferred to some other memory device, and then logged and sorted in a database for future analysis. If, on the other hand, the ECU 25 determines (decision 222) that the shifted signal did not cancel out the original noise signal within a residual tolerance, the ECU 25 moves on to block 224 in which the noise signal is characterized as broadband noise.

It should be noted that, depending on the embodiment, the process 202 in FIG. 10 may not be employed following the baselining method (e.g., process 188). For example, in some embodiments, it may be determined that the fingerprint 200 is a "good fingerprint" 226 without employing process 202. In either case, verified fingerprints 230 (e.g., fingerprint 200 and/or good fingerprint 226) may be stored in a database 232 for later access during an engine monitoring process 234, as shown in an embodiment of the process 234 in FIG. 11. For example, during the illustrated process 234, noise from the engine 10 is sensed (e.g., detected or recorded) (block 236). As previously described, the noise may be sensed via the knock sensor 23, or some other sensor configured to detect noise or vibrations of the engine 10. The noise signal may be preconditioned (e.g., scaled, normalized, and/or filtered) for processing, in accordance with the description of FIGS. 4-6. The crankshaft sensor 66 may also sense, detect, or record a position of the crankshaft 54 (e.g., in crank angles). Accordingly, the noise signal (e.g., preconditioned noise signal) may be plotted, via the ECU 25, against the position of the crankshaft 54. As previously described, in certain embodiments, the noise signal may be plotted against time instead of position of the crankshaft 54.

The process 234 further includes accessing the fingerprints 230 in the database 232 (block 238). For example, the ECU 25 may access the fingerprint 230 that relates to a particular operating event being monitored via the process 234. Depending on the embodiment, the operating event (or condition) may be peak firing pressure, opening of the intake valve 62, closing of the intake valve 62, opening of the exhaust valve 64, closing of the exhaust valve 64, or some other operating event (or condition) of the engine 10.

After accessing the fingerprint 230 corresponding to the operating event (or condition) being monitored by the ECU 25 via process 234, the ECU 25 may correlate the fingerprint 230 and the noise signal (e.g., preconditioned noise signal) to determine if the noise signal includes a portion that matches the fingerprint 230. For example, as previously described, the fingerprint 230 may include the ADSR envelope 182 relating to the operating event being monitored and generated during the baselining process (e.g., process 188). The ADSR envelope 182 of the fingerprint 230 may be shifted or dragged along the time or crankshaft 54 position axis of the noise signal (e.g., preconditioned noise signal) to determine if the fingerprint 230 matches any portion of the noise signal. For example, the ADSR envelope 182 of the fingerprint 230 may be directly compared or matched with portions of the noise signal, or one or more operating ADSR envelopes may be generated for portions of the noise signal (e.g., in accordance with the descriptions of FIGS. 6 and 7) to compare with the ADSR envelope 182 of the fingerprint 230. Further, in general, the operating event may have occurred within a known range of time or crankshaft 54 positions (e.g., in crank angles). Thus, the portion of the noise signal processed by the ECU 25 to determine whether a portion of the noise signal matches the fingerprint 230 may be reduced to the known range of time or crankshaft 54 positions. It should be noted that the match between the fingerprint 230 and the noise signal may not be an exact match between the fingerprint 230 and the noise signal. For example, the fingerprint 230 may substantially match a portion of the noise signal and may be rated by a percentage of accuracy of the match. A threshold (e.g., stored in the memory 74 of the ECU 25) may enable the ECU 25 to determine if the percentage of accuracy of the match between the fingerprint 230 and the noise signal is substantial enough to consider the fingerprint 230 and the noise signal a match. The threshold may be at least equal to or greater than a 75% match, an 80% match, an 85% match, a 90% match, a 95% match, a 97% match, a 98% match, a 99% match, or a 100% match.

In decision 242, the ECU 25 determines if the fingerprint 230 matches any portion of the noise signal (e.g., preconditioned noise signal) from block 236. If the correlation in block 240 is a match in decision 242, the operating event being monitored is verified. Further, as shown in block 244, the particular location of the operating event (e.g., in time or in crank angles of the crankshaft 54) may be determined. For example, as previously described, the operating event may occur at the intersection point 205 (e.g., between the ADSR envelope 182 and the operating event indicator 203) in FIG. 9, which, in some embodiments, corresponds to the midpoint on the decay 184 vector of the ADSR envelope 182. Accordingly, the ECU 25 may overlay the ADSR envelope 182 of the fingerprint 230 on the noise signal plotted against crankshaft 54 position, and determine that the operating event occurred at the x-coordinate (e.g., time or crankshaft 54 position coordinate) of the intersection point 205 on the ADSR envelope 182.

If the fingerprint 230 is not matched with any portion of the noise signal at decision 242, the process 234 may either return to block 236 (e.g., sense engine noise) or return to block 238 (access fingerprint(s) in database). For example, in some embodiments, the process 234 may be utilized to monitor multiple operating events. Accordingly, the process 234 may include accessing multiple fingerprints 230 for correlation with the noise signal. The multiple fingerprints 230 may be accessed all in one step, or each fingerprint 230 may be accessed and then correlated to the noise signal independently to determine and verify operating events.

In accordance with the present disclosure, it should be noted that operating event(s) and conditions may be any operating event or condition of the engine 10. For example, the operating event may be an opening of the exhaust valve 64, a closing of the exhaust valve 64, an opening of the intake valve 62, a closing of the intake valve 62, peak firing pressure, or any other operating event of the engine 10. The event may additionally include valve sticking, valve disconnection, excessive valve timing drift, excessive valve seating velocity, complete valve lash consumption in operation, valve leaking. Further, it should be noted that the crank angle at which the operating event occurs may be determined by the same or similar process steps described above. For example, in some embodiments, the operating event may occur at a different point along the decay 184 vector, or along one of the other vectors of the ADSR envelope 182. The operating event indicator 203 shown in FIG. 9 may be provided to the ECU 25 by a limit switch, or by some other mechanism configured to detect the operating event during the baselining process (e.g., process 188) that may not be included in the engine 10 during normal operation. Further, it should be noted that the fingerprints 200, 226, 230 associated with each operating event may vary for each operating event, and may vary for each model, make, or series of engines 10. Thus, the baselining process (e.g., process 188) to determine fingerprints 200, 226, 230 for various operating events may be carried out for each particular engine 10, and each engine 10 may include different fingerprints 200, 226, 230 for the same operating event.

Figure 12:
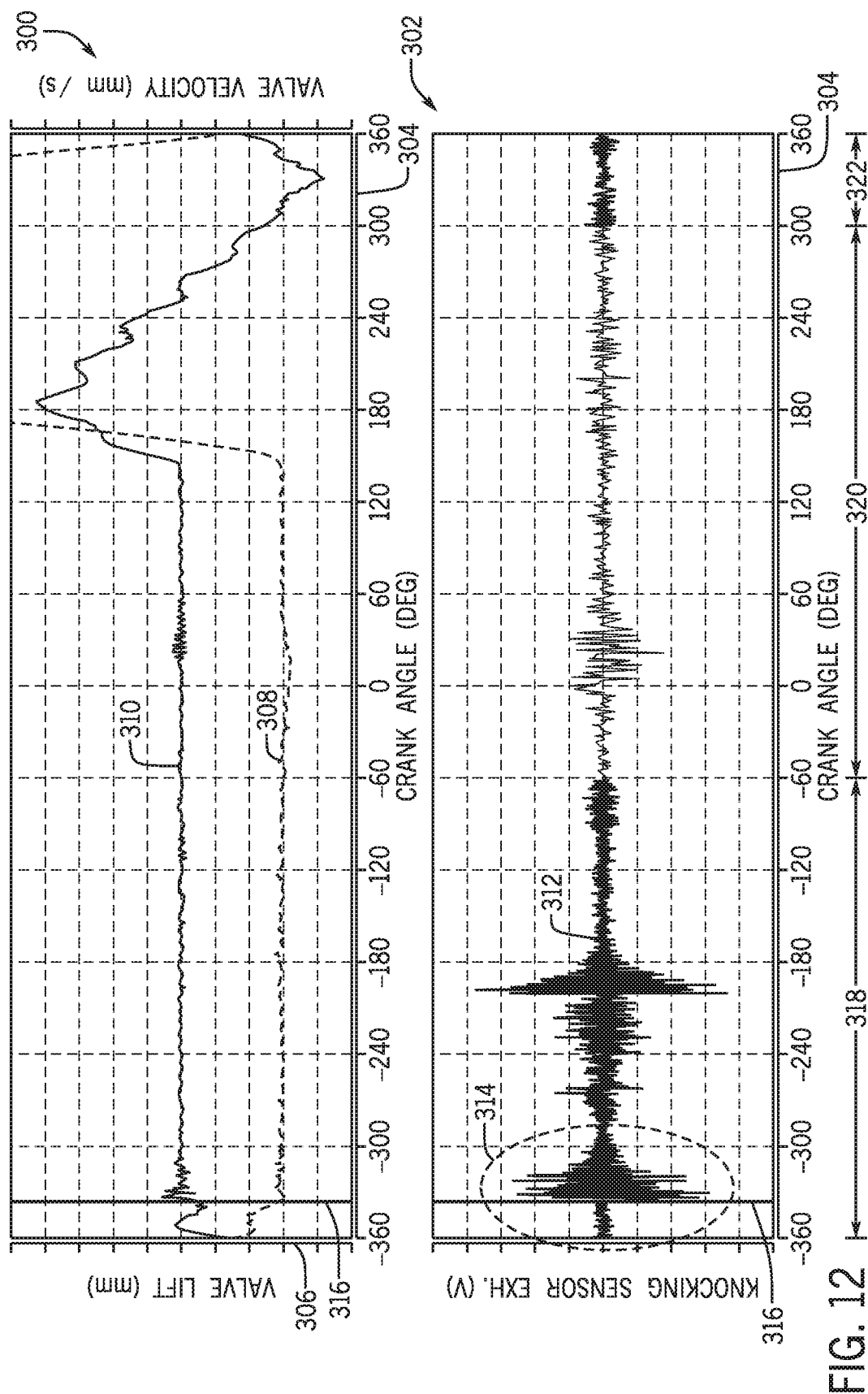
FIG. 12 illustrates an embodiment of charts depicting valve lift and velocity (top chart) and cylinder head vibration signal (valve noise) (bottom chart)

Turning now to FIGS. 12-16, the figures illustrate statistical techniques useful in detecting valve train 70 events and valve lash 80 drift or distance. For example, FIG. 12 depicts embodiments of two charts 300 and 302 that share the same x-axis 304. The chart 300 includes a dynamic valve lift in a thermodynamic cycle vs. crank angle in the x-axis 304 with corresponding measured valve lift data in a y-axis 306. The chart 302 is correlative to the chart 300 and includes the same crank angle degree x-axis 304. The top chart 300 includes signals or curves 308 and 310, where curve 308 is measured valve lift while curve 310 is valve velocity (e.g., derivative of valve lift 308 over time). The chart 302 includes a signal 312 (e.g., vibration or noise signal) representative of the dynamic response of the cylinder head 14 as measured by the knock sensor(s) 23. While the signal 312 is typically used to detect knock (e.g., engine "pinging"), it has been found that the signal 312 includes components representative of, for example, the valves 62, 64 contacting seat rings and/or other valve train 70 components. A decay 312 portion of the signal 312, such as decay noise 314 of the cylinder head 14 may be used to extract valve train 70 dynamics.

In the depicted embodiment, a valve closing event 316 is identified and the dynamic noise response signal 312 captured by the knocking sensor may include data representative of, for example, valve timing which can be correlated to the actual valve lash 80 in operation. Monitoring valve timing drift can be used to optimize service adjustment interval, detect early valve and seat ring life and/or valve train structure failure (like valve stem 72 disengagement). To derive the valve lift event 316, the noise signal 312 may be analyzed to look for a pattern representative of a start if the dynamic portion 314 shown. In order to derive a model suitable for identifying certain valve train 70 conditions, (e.g., valve lash 80 drift, valve stem 70 disconnection), a test bed may be used to sense vibration and acceleration of the engine 10. For example, one or more vibrometers (e.g., differential laser vibrometers) and one or more accelerometers may be used to capture valve seating data 308, 310 and valve noise data 312; and the crank angle sensor 66 may provide crank angle data to define the x-axis 304. Measurements may be taken in steps, such as a first step that provides for natural frequency identification of the signals 308, 310, and/or 312. For example, certain angles 318, 320, 322 may each include a respective natural frequency F and associated phase Φ(F).

A full load operations second step may also be used to observe the engine 10 during full load. The full load operation may be further subdivide into a first phase that observes during operation of two or more exhaust (or intake) valves 62, 64 per cylinder and a second phase that observes operations of a single exhaust (or intake) valve 62, 64 per cylinder. The observations 308, 310, 312 may then be used to derive certain graphs or models, such as the graphs depicted in FIGS. 13 and 14. In one example, a magnitude (e.g., |F| where F is a frequency domain) and a phase (e.g., Φ(F)) of a dynamic response of the cylinder head 14 measured by one or more sensors 23 in a crank angle range (e.g., between −720° to 720°) contain information regarding the valves 62, 64 seating excitation force and timing respectively, and may thus be used to create the graphs or models of FIGS. 13 and 14.

Figure 13:
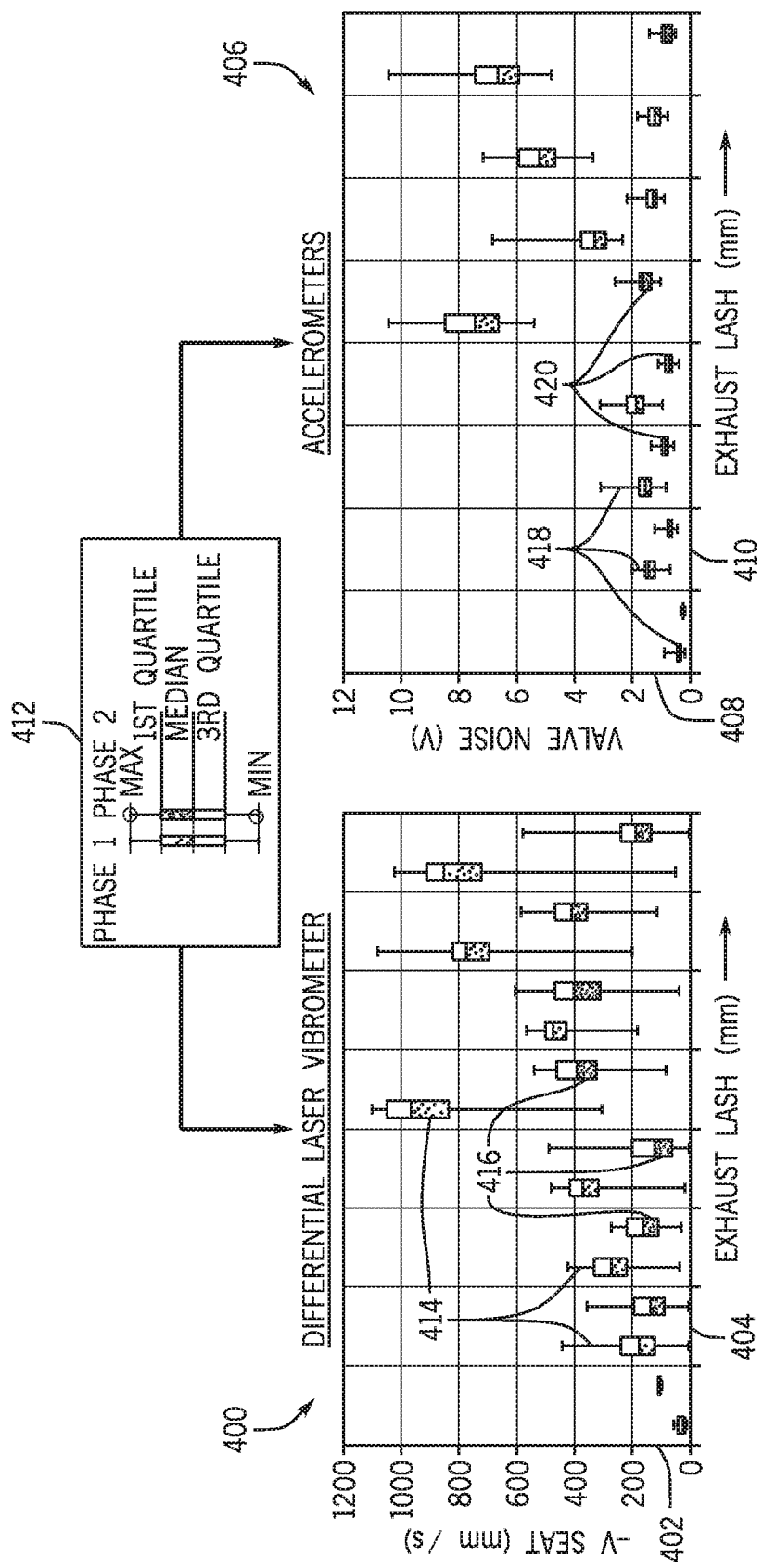
FIG. 13 illustrates an embodiment of charts depicting derived valve lash versus valve seating velocity and valve noise.

More specifically, FIG. 13 shows an embodiment of a graph 400 depicting valve seating velocity change (e.g., mm/s in a y-axis 402) and exhaust lash (e.g. mm in an x-axis 404). A second graph 406 included in FIG. 13 depicts a valve noise (measured as maximum of cylinder head accelerometer signal around the valve closing time) in a y-axis 408 and exhaust lash (e.g. mm in an x-axis 410). Graph 400 may be derived base on vibrometer data while graph 406 may be derived based on accelerometer data. A legend 412 shows max, min, and quartiles for boxes 414, 416, 418, and 420 of the graphs 400 and 406. In the depicted examples, graph 400 is a box plot that includes boxes 414 representative of a first analysis phase (e.g., analysis phase using two exhaust valves 64 or two intake valves 62) and boxes 416 representative of a second analysis phase (e.g., analysis phase using a single exhaust valve 64 or a single intake valve 62). Likewise, graph 406 is a box plot having boxes 418 analyzed during the first analysis phase and boxes 420 analyzed during the second analysis phase.

As can be observed in graph 400, as lash (x-axis 404) increases (e.g., drifts) the valve seating excitation (y-axis 402) also increases. However, using only vibrometer data may not be as precisely correlative to (or predictive of) valve lash 80 and/or valve lash 80 drift as desired. Likewise, graph 406 shows that as lash (x-axis 410) increases valve noise (y-axis 408) also increases due to higher valve seating excitation. However, noise data may also not be as precisely correlative to (or predictive of) valve lash 80 and/or valve lash 80 drift as desired.

Figure 14:
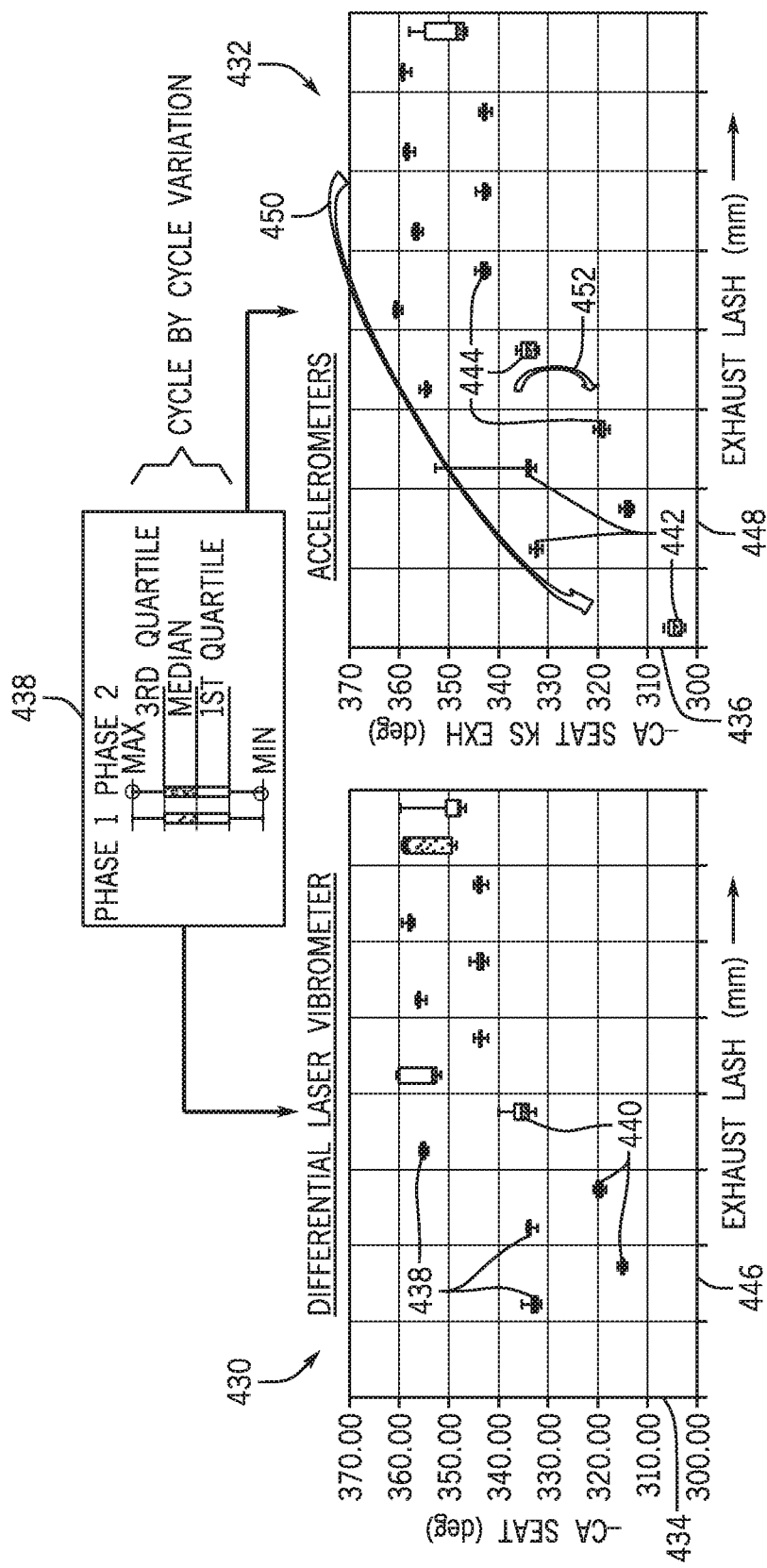
FIG. 14 illustrates an embodiment of charts depicting correlation between valve lash in operation and closing crank angle captured by valve lift measurement (left chart), and crank angle triggered on knocking sensor at a cylinder head (right chart)

Advantageously, it has been observed that adding crank angle data (e.g., data derived via sensor 66) to the data of graphs 400 and 406 may improve predictive accuracy. Accordingly, FIG. 14 shows embodiments of graphs 430, 432 that incorporate crank angle measurements. More specifically, graph 430 includes closing crank angle degree (e.g., measured by laser vibrometer) in a y-axis 434, while graph 432 also includes closing crank angle degree (e.g., measured by trigger knocking sensor signal) in a y-axis 436. Also shown is a legend 438 that depicts max, min, and quartiles (e.g., over a population of 100 thermodynamic cycles) for boxes 438, 440, 442, 444 of the graphs 430 and 432 (statistically representative of stationary engine operation).

Crank angle measurements may provide for enhanced accuracy, including predictive accuracy of exhaust lash and/or lash drift shown in x-axes 446, 448. For example, long term lash drift tendencies 450 and/or short term drift (e.g., stem 72 removal) 452 may be more easily derived. In certain embodiments, the data used to derive graphs 300, 302, 400, 406, 430, and/or 432 may be used to construct certain models or graphs suitable for acquiring crank angle data via the crank angle sensor 66 and engine noise data via the knock sensor(s) 23, and for deriving certain engine conditions useful, for example, in condition based maintenance based on the data acquired, such as the graphs or models shown with respect to FIGS. 15 and 16.

Figure 15:
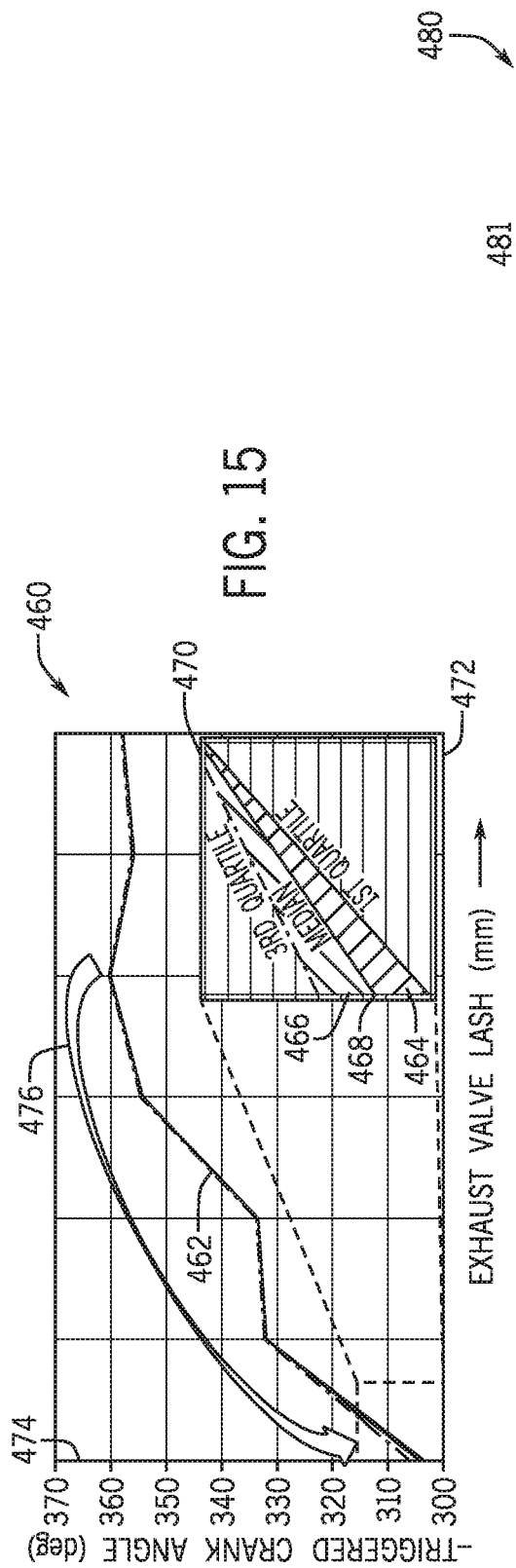
FIG. 15 illustrates an embodiment of a chart suitable for condition based maintenance of the engine of FIG. 1.

Turning now to FIG. 15, the figure shows an embodiment of a statistical valve train model 460 (e.g., threshold valve lash model) that may be suitable for detecting certain valve train conditions. The model 460 may be provided as computer instructions or code stored in the memory 74 and executable by the processor 72. The model 460 may also be stored and executed by external systems, such as external computing systems. In the depicted embodiment, the model 460 may be created by various techniques, such as mathematical techniques suitable for analyzing the data of graphs 300, 302, 400, 406, 430, and/or 432. For example, curve fitting techniques (e.g., polynomial curve fitting, least square regression analysis, linear interpolation, non-linear interpolation), data mining techniques (e.g., data cluster analysis, k-mean analysis), regression analysis and the like, may be used to transform the sensor 23, 66 data into the model 260

As depicted, the model 460 includes a graph or curve 462 having statistical quartiles 464, 466 suitable for expressing median 468 values and deviations from the median 468. For example, a detail section 470 of the model is shown, having the first quartile 464, third quartile 466, and median 468. Indeed, the model 462 may provide for enhanced analysis by enabling a data point to be identified as a median or quartile data point, or point outside of the curve 462. The model 460 includes an x-axis 472 representative of a hot valve lash or current valve lash 80 (e.g., in mm) present during engine operations. The model 460 additionally includes a y-axis 474 representative of triggered crank angle degrees. In use, knock sensor 23 data may be used to determine that certain valve train 70 dynamics have occurred. For example, decay portion 314 of FIG. 12 shows that certain valve train 70 dynamics have occurred related to the valve train 70. The crankshaft sensor 66 may then be used to determine the crank angle at which the dynamics occurred. Given the crank angle (e.g., statistically determined by triggering the accelerometer sensors), the curve 462 may be used to derive the hot valve lash or valve lash 80 present during current engine 10 operations. For example, a horizontal line from the y-axis at the measured crank angle may be drawn to intersect with the curve 462, and the intersection point may then correspond to the valve lash 80 currently present. Accordingly, noise may be detected and analyzed to determine the current exhaust valve lash 80 (e.g., point in the x-axis 472). Additionally, the current exhaust valve lash 80 may be found to be a median quartile valve lash, first quartile valve lash, or second quartile valve lash based on where the point falls in the first quartile 464, third quartile 466, and median 468.

As valve lash 80 adjustments are made, a user may log or otherwise save the valve lash adjustment. Valve drift may then be derived via the equation: valve drift=lash adjustment−hot lash. For example, as valve 62, 64 wears down during use, successive adjustments may be made and recorded. As each valve lash 80 adjustment is successively recorded, the model of FIG. 15 may be used to derive valve drift over time, for example, due to lash 80 reduction. For example, as lash 80 is reduced, a triggered crank angle may also drift lower in the combustion cycle, as shown by trend 276. Accordingly, a valve timing drift may be detected and certain control actions may be taken, such as via the devices 27, 31. Additionally or alternatively, condition based maintenance may be performed, for example to trigger service interval and balance the valve timing drift during engine lifetime. Indeed, instead of performing maintenance at a fixed schedule, the techniques described herein may monitor engine noise, detect a valve timing drift, and then alert or inform an interested party, or perform other actions (e.g., automatically adjust valve 62, 64 timing).

Likewise, lash 80 drift during operation may be detected as related to cylinder head 14 wear acceleration, overexpansion of valve train 70 components, loosened adjustment screw, and so on. Indeed, by triggering the engine noise to derive the hot valve lash 80 (e.g., x-axis), the model 460 may then be used to derive how the valve lash 80 may change over time due to valve lash drift. Such movements may then be applied to schedule the valve lash 80 adjustment, to detect rates of lash 80 consumption, to determine if the cylinder head 14 is wearing out as scheduled, and/or to determine if there may be overexpansion of valve train 70 components. Other models may also be created based on the techniques described herein.

Figure 16:
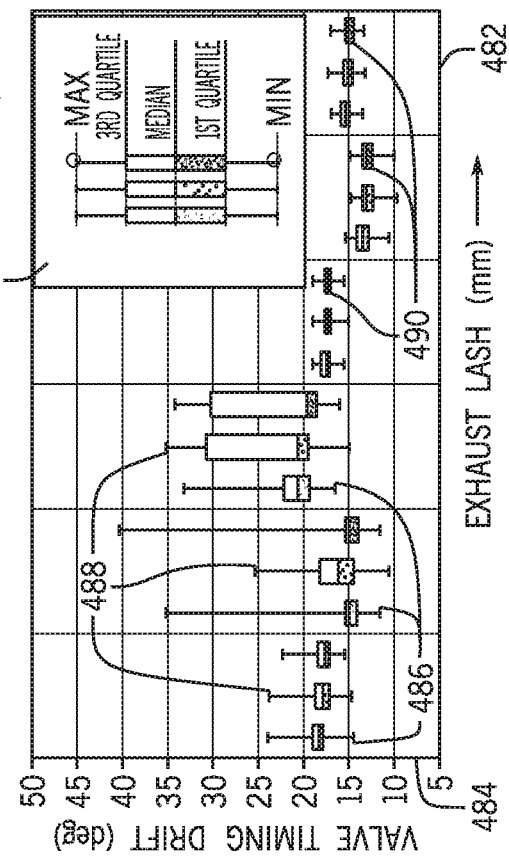
FIG. 16 illustrates an embodiment of a second chart suitable for condition based maintenance of the engine of FIG. 1.

For example, FIG. 16 illustrates an embodiment of a model 480 (e.g., valve timing change model) suitable for deriving a sudden valve timing change due to valve train structure failure, such as valve stem 72 disengage during engine 10 operations. The model 480 includes an x-axis 482 representative of the exhaust lash 80 measured in increasing mm. The model 480 also includes a y-axis 484 representative of valve 62, 64 timing drift measured in degrees. Box plots 486 are the variation of valve timing due to one valve disengagement derived via knock sensor 23 installed next to exhaust valve 64, boxes 488 are representative of data derived knock sensor 23 installed in proximity to intake valve 62, and boxes 490 are representative of data derived via a charge accelerometer bolted on the cylinder head. As illustrated, the trigger crank angle of the cylinder head acceleration signal may be sensed and used to determine sudden valve train failure, actual valve lash (x coordinate on x-axis 482), and likewise, a valve timing drift (y coordinate on y-axis 484) may be derived, and by correlating the current lash with the valve timing, a determination may be made if the boxes 486, 488, 490 includes a point having the x, y coordinate. If so, then it is likely that the valve stem 72 has been disconnected. The closer valve timing drift falls on a box's (e.g., box 486, 488, 490) median then the more likely the occurrence of the disconnection event. In other words, a rapid change in valve timing may be detected by applying statistical analysis on the cylinder head acceleration signal, for example, to curve 462. Indeed, if during engine operations the hot lash valve derived via curve 462 is found to have varied by a certain amount (e.g., between 1-2 mm, 0.5-4 mm, or more) at a certain time (e.g., between 0.5 and 10 seconds, 0.05 and 10 minutes, or more).

Figure 17:
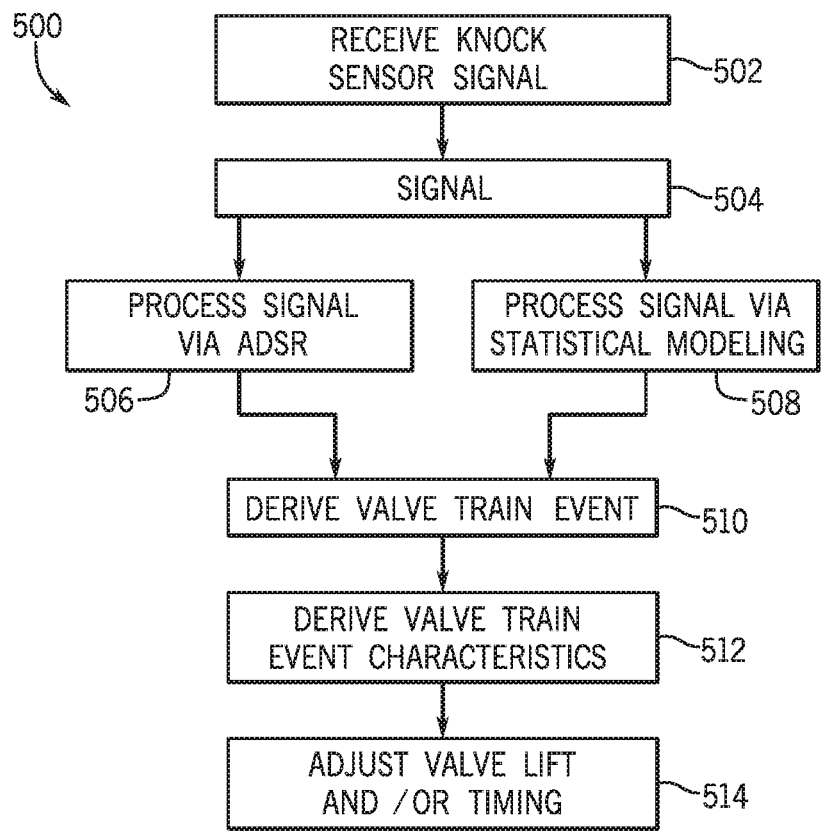
FIG. 17 illustrates an embodiment of a process suitable for detecting valve events and for applying valve control based on the detected valve events.

Turning now to FIG. 17, the figure illustrates a flowchart of an embodiment of a process 500 that may be suitable for applying certain knock sensor 23 signal processing techniques to detect valve train 70 conditions and to derive control actions based on the detected conditions. The process 500 may be implemented as computer code or instructions stored in the memory 74 and executable via processors 72. In the depicted embodiment, the process 500 may first receive (block 502) a signal 504 from one or more knock sensors 23. The signal 504 may then be processed via ADSR techniques (block 506) and/or via statistical techniques (block 508). The ADSR techniques used are previously described with respect to FIGS. 4-11 while the statistical techniques are previously described with respect to FIGS. 12-16.

Applying (block 506) ADSR signal processing may result in deriving (block 510) that a valve train 70 event has occurred, such as valve lash 80 drifting outside of a range, valve sticking, valve disconnection, excessive valve timing drift, excessive valve seating velocity, complete valve lash consumption in operation, valve leaking, and so on. Likewise, applying (block 508) the statistical techniques may derive (block 510) valve train 70 events including valve lash 80 drifting outside of a range, valve sticking, valve disconnection, excessive valve timing drift, excessive valve seating velocity, complete valve lash consumption in operation, valve leaking, and so on.

Certain of the detected valve events may be corrected or ameliorated by certain control actions. For example, valve lash or valve timing drift outside of a certain range may be corrected via the valve adjustment device 27 and/or by applying variable valve timing via the camless valve actuator 31 or similar systems. Variable valve timing may include late intake valve closing techniques where the intake valve 62 is held open longer than normal, resulting in the piston 20 pushing air through the cylinder 26 and back into an intake manifold during the compression stroke. The variable valve timing may additionally include early intake valve closing techniques where the intake valve 62 is closed earlier than normal, for example midway through the intake stroke, resulting in reducing pumping losses. The variable valve timing may additionally include early/late exhaust valve closing 64, enabling the manipulation of a quantity of exhaust gas that is left in the cylinder 26.

In order to provide for control actions, the process 500 may derive (block 512) characteristics related to the event derived in block 510. For example, if the event is a valve lash drift event, then the process 500 may derive (block 512) an amount of valve lash 80 and/or an amount of drift over time. If the event is a valve timing event, a measure of mistiming may be derived (block 512). Likewise, excessive valve seating velocity characteristics such as seating velocity may be derived (block 512). Other derivations include lash 80 consumption measures, valve leak measures, and the like. Based on the derived (block 510) event(s) and derived (block 512) characteristics for the event(s), the process 500 may adjust (block 514) valve lift and/or valve timing. For example, the ECU 25 may control the valve adjustment device 27 and/or a camless valve actuator 31 to change valve lift and/or to change valve timing. Accordingly, the process 500 may detect and respond via control actions (block 514) to a variety of valve conditions, which may increase engine life, engine efficiency, and improve maintenance schedules.

Technical effects of the invention include applying noise sensor data, such as knock sensor data, to create one or more models suitable for deriving valve drift. The models may include ADSR models and statistical models. In one embodiment, the one or more models may then be used to provide for condition based maintenance (CBM) of an engine. For example, the one or more models may monitor engine noise, detect a valve timing drift, and then alert or inform an interested party, or perform other actions (e.g., automatically adjust valve timing). Likewise, lash consumption may be detected as related to cylinder head wear acceleration and/or overexpansion of valve train 70 components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
an engine control system configured to control a combustion engine, wherein the engine control system comprises a processor configured to:
receive a vibration signal sensed by a knock sensor disposed in the combustion engine;
correlate the vibration signal with a fingerprint having at least an attack, decay, sustain, release (ADSR) envelope indicative of an operating event of a valve train of the combustion engine and analyze the vibration signal with a statistical valve train model;
detect if the operating event has occurred based on correlating of the vibration signal with the fingerprint and based on analyzing the vibration signal with the statistical valve train model; and
control the valve train based on the operating event, wherein the ADSR envelope comprises four principle parameters including an attack parameter, a decay parameter, a sustain parameter, and a release parameter, wherein the location of the ADSR envelope at which the operating event occurs is within a mid-region of a decay vector of the ADSR envelope.

2. The system of claim 1, wherein the processor is configured to control the valve train by controlling a valve adjustment device, a variable valve timing, or a combination thereof.

3. The system of claim 2, wherein the valve adjustment device comprises a variable valve lifter and wherein controlling variable valve timing comprises controlling a valve actuator, the variable valve lifter, of a combination thereof.

4. The system of claim 1, wherein the processor is configured to detect operating event characteristics for the operating event, wherein the engine control system is configured to control the valve train based on the operating event and on the operating event characteristics.

5. The system of claim 4, wherein the operating event characteristics comprise a valve lash distance, a valve lash consumption, a valve timing drift measure, a valve seating velocity, or a combination thereof.

6. The system of claim 1, wherein the processor is configured to derive the ADSR envelope from a baseline noise signal indicative of the operating event and plot the ADSR envelope and operating event indicator data against time to derive a location of the ADSR envelope at which the operating event occurs.

7. The system of claim 1, wherein the processor is configured to:
receive a crankshaft signal sensed by a crank angle sensor disposed in the combustion engine, wherein the crankshaft signal is representative of an engine crank angle; and
monitor a valve timing by deriving a cylinder head acceleration measurement via the vibration signal received by the knock sensor, wherein the engine control system is configured to monitor the valve timing by deriving a valve lash based on the vibration signal, the engine crank angle, and a threshold valve lash model included in the statistical valve train model.

8. A method, comprising:
receiving a vibration signal sensed by a knock sensor disposed in a combustion engine;
correlating the vibration signal with a fingerprint having at least an attack, decay, sustain, release (ADSR) envelope indicative of an operating event of a valve train of the combustion engine and analyzing the vibration signal with a statistical valve train model;
detecting if the operating event has occurred based on correlating of the vibration signal with the fingerprint and based on analyzing the vibration signal with the statistical valve train model; and
controlling the valve train based on the operating event, wherein the ADSR envelope comprises four principle parameters including an attack parameter, a decay parameter, a sustain parameter, and a release parameter, wherein the location of the ADSR envelope at which the operating event occurs is within a mid-region of a decay vector of the AD SR envelope.

9. The method of claim 8, wherein controlling the valve train based on the operating event comprises controlling a valve adjustment device, a variable valve timing, or a combination thereof.

10. The method of claim 8, comprising detecting operating event characteristics for the operating event, wherein the controlling the valve train comprises controlling the valve train based on the operating event and on the operating event characteristics, and wherein the operating event characteristics comprise a valve lash distance, a valve lash consumption, a valve timing drift measure, a valve seating velocity, or a combination thereof.

11. The method of claim 8, comprising deriving the ADSR envelope from a baseline noise signal indicative of the operating event and plot the ADSR envelope and operating event indicator data against time to derive a location of the ADSR envelope at which the operating event occurs.

12. The method of claim 8, comprising:
receiving a crankshaft signal sensed by a crank angle sensor disposed in the combustion engine, wherein the crankshaft signal is representative of an engine crank angle; and
monitoring a valve timing by deriving a cylinder head acceleration measurement via the vibration signal received by the knock sensor, wherein the engine control system is configured to monitor the valve timing by deriving a valve lash based on the vibration signal, the engine crank angle, and a threshold valve lash model included in the statistical valve train model.

13. A tangible, non-transitory computer readable medium storing code configured to cause a processor to:
receive a vibration signal sensed by a knock sensor disposed in a combustion engine;
correlate the vibration signal with a fingerprint having at least an attack, decay, sustain, release (ADSR) envelope indicative of an operating event of a valve train of the combustion engine and analyze the vibration signal with a statistical valve train model;
detect if the operating event has occurred based on correlating of the vibration signal with the fingerprint and based on analyzing the vibration signal with the statistical valve train model; and
control the valve train based on the operating event, wherein the ADSR envelope comprises four principle parameters including an attack parameter, a decay parameter, a sustain parameter, and a release parameter, and wherein the location of the ADSR envelope at which the operating event occurs is within a mid-region of a decay vector of the ADSR envelope.

14. The tangible, non-transitory computer readable medium storing code of claim 13, that, when executed, further cause the processor to control the valve train by controlling a valve adjustment device, a variable valve timing, or a combination thereof.

15. The tangible, non-transitory computer readable medium storing code of claim 13 that, when executed, further cause the processor to detect operating event characteristics for the operating event, wherein the code cause the processor to control the valve train based on the operating event and on the operating event characteristics, and wherein the operating event characteristics comprise a valve lash distance, a valve lash consumption, a valve timing drift measure, a valve seating velocity, or a combination thereof.

16. The tangible, non-transitory computer readable medium storing code of claim 13, that, when executed, further cause the processor to derive the ADSR envelope from a baseline noise signal indicative of the operating event and plot the ADSR envelope and operating event indicator data against time to derive a location of the ADSR envelope at which the operating event occurs.

17. The tangible, non-transitory computer readable medium storing code of claim 13, that, when executed, further cause the processor to:
receive a crankshaft signal sensed by a crank angle sensor disposed in the combustion engine, wherein the crankshaft signal is representative of an engine crank angle; and
monitor a valve timing by deriving a cylinder head acceleration measurement via the vibration signal received by the knock sensor, wherein the code, when executed further cause the processor to monitor the valve timing by deriving a valve lash based on the vibration signal, the engine crank angle, and a threshold valve lash model included in the statistical valve train model.

* * * * *